US010775117B2

(12) United States Patent
Rousselet et al.

(10) Patent No.: US 10,775,117 B2
(45) Date of Patent: Sep. 15, 2020

(54) WATER COLLECTION/DEFLECTION ARRANGEMENTS

(71) Applicant: Baltimore Aircoil Company, Inc., Jessup, MD (US)

(72) Inventors: Yohann Lilian Rousselet, Glen Burnie, MD (US); Christopher Patrick Auth, Catonsville, MD (US); Dina Malamud, Lutherville, MD (US)

(73) Assignee: Baltimore Aircoil Company, Jessup, MD (US)

( * ) Notice: Subject to any disclaimer, the term of this patent is extended or adjusted under 35 U.S.C. 154(b) by 240 days.

(21) Appl. No.: 15/717,441

(22) Filed: Sep. 27, 2017

(65) Prior Publication Data

US 2018/0094884 A1 Apr. 5, 2018

Related U.S. Application Data

(60) Provisional application No. 62/402,038, filed on Sep. 30, 2016.

(51) Int. Cl.
| | | |
|---|---|---|
| *F28F 25/04* | (2006.01) | |
| *F28F 25/12* | (2006.01) | |
| *F28C 1/00* | (2006.01) | |
| *F28D 5/02* | (2006.01) | |
| *F28C 1/14* | (2006.01) | |

(52) U.S. Cl.
CPC .............. *F28F 25/12* (2013.01); *F28C 1/00* (2013.01); *F28C 1/14* (2013.01); *F28D 5/02* (2013.01); *F28F 25/04* (2013.01)

(58) Field of Classification Search
CPC ...... F28C 1/00; F28C 1/14; F28D 5/02; F28F 25/04; F28F 25/12

USPC .............. 261/30, 97, 110, DIG. 11
See application file for complete search history.

(56) References Cited

U.S. PATENT DOCUMENTS

| | | |
|---|---|---|
| 2,431,389 A | 11/1947 | Fleisher |
| 3,437,319 A | 4/1969 | Engalitcheff, Jr. et al. |
| 3,572,657 A | 3/1971 | Bradley, Jr. |
| 3,784,171 A | 1/1974 | Engalitcheff, Jr. |
| 4,198,215 A | 4/1980 | Regehr |

(Continued)

FOREIGN PATENT DOCUMENTS

WO 2015071822 A1 5/2015

OTHER PUBLICATIONS

Baltimore Aircoil Company, Inc.; Series V Cooling Tower, Product & Application Handbook vol. V; publicly available before Sep. 30, 2016; 27 pages.

(Continued)

*Primary Examiner* — Charles S Bushey
(74) *Attorney, Agent, or Firm* — Fitch, Even, Tabin & Flannery LLP

(57) ABSTRACT

Improved water management systems which deflect or collect evaporative liquid exiting counterflow heat exchangers and improve airflow distribution are provided. Such heat exchangers include open cooling towers, closed circuit cooling towers, and evaporative condensers. The improved water management systems eliminate water splash out and the noise associated with water splashing. Further, when the fan assemblies are located below the evaporative heat exchanger, the improved water management systems keep the fans dry and prevent freezing in subzero climates.

45 Claims, 32 Drawing Sheets

(56) References Cited

U.S. PATENT DOCUMENTS

| | | | |
|---|---|---|---|
| 4,218,408 A | 8/1980 | Henning | |
| 4,521,350 A | 6/1985 | Lefevre | |
| 5,268,011 A | 12/1993 | Wurz | |
| 5,545,356 A | 8/1996 | Curtis et al. | |
| 5,645,770 A | 7/1997 | McNulty | |
| 5,958,306 A | 9/1999 | Curtis | |
| 6,237,900 B1 | 5/2001 | Drew | |
| 6,574,980 B1 | 6/2003 | Morrison | |
| 8,585,024 B2 | 11/2013 | Ferree | |
| 9,273,915 B2 | 3/2016 | Patel | |
| 9,644,904 B2 | 5/2017 | Curtis | |
| 9,897,399 B2 * | 2/2018 | Kroger | F28F 25/04 |
| 9,970,719 B2 | 5/2018 | Bean, Jr. | |
| 2007/0187851 A1 | 8/2007 | Facius | |
| 2011/0049733 A1 | 3/2011 | Ferree | |
| 2011/0315350 A1 | 12/2011 | Curtis | |
| 2012/0111762 A1 | 5/2012 | Patel | |
| 2014/0166254 A1 | 6/2014 | Carter | |
| 2015/0330710 A1 | 11/2015 | Curtis | |
| 2016/0290745 A1 | 10/2016 | Kröger | |
| 2019/0063855 A1 | 2/2019 | Auth | |

OTHER PUBLICATIONS

Gohl®, Dunstturm DT ecoTEC, Kühlturm offener Kreislauf (product brochure in German regarding forced draft tower with unhoused centrifugal fan concept); Oct. 2014, 8 pages.

International Search Report and Written Opinion from International Application No. PCT/US2018/048086, dated Oct. 29, 2018, 11 pages.

Munters Corporation; Polymer Fluid Cooler (PFC) product guide; Sep. 2015, 2 pages.

Tower Tech, Inc.; TTXR Series Technical Reference Guide; Jan. 2012, 24 pages.

U.S. Non-Final Office Action from U.S. Appl. No. 15/692,585 dated Sep. 18, 2019; 10 pages.

Amendment from U.S. Non-Final Office Action from U.S. Appl. No. 15/692,585, dated Dec. 18, 2019; 12 pages.

* cited by examiner

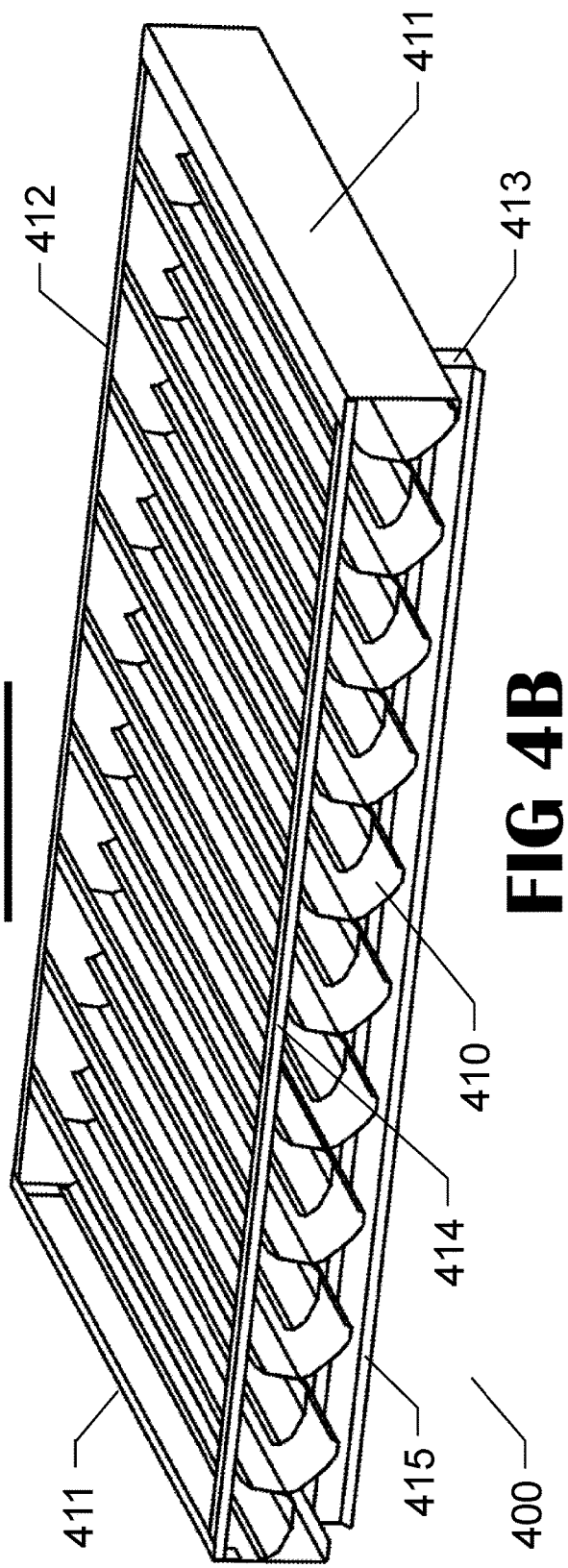
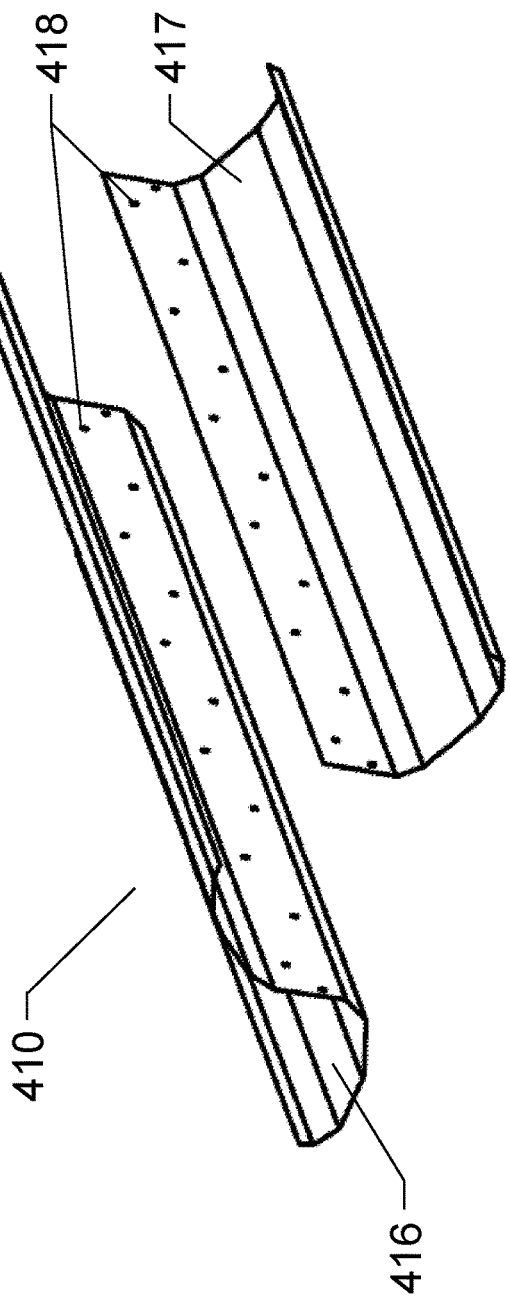
FIG 4A
FIG 4B

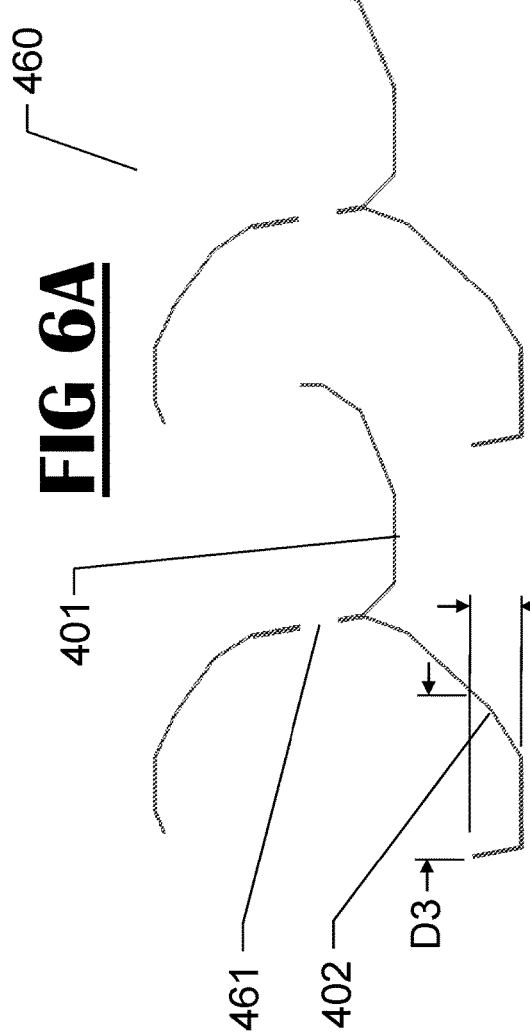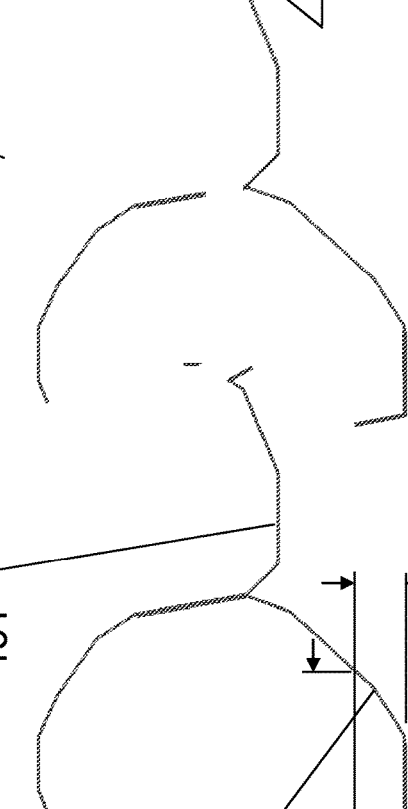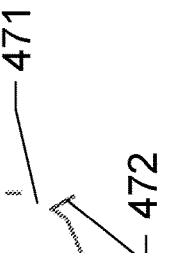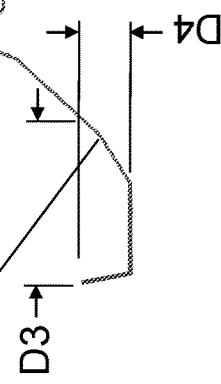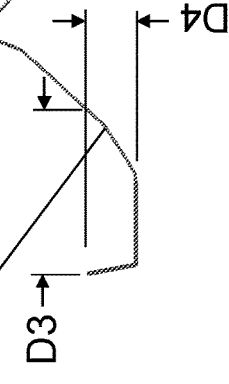
FIG 6A
FIG 6B

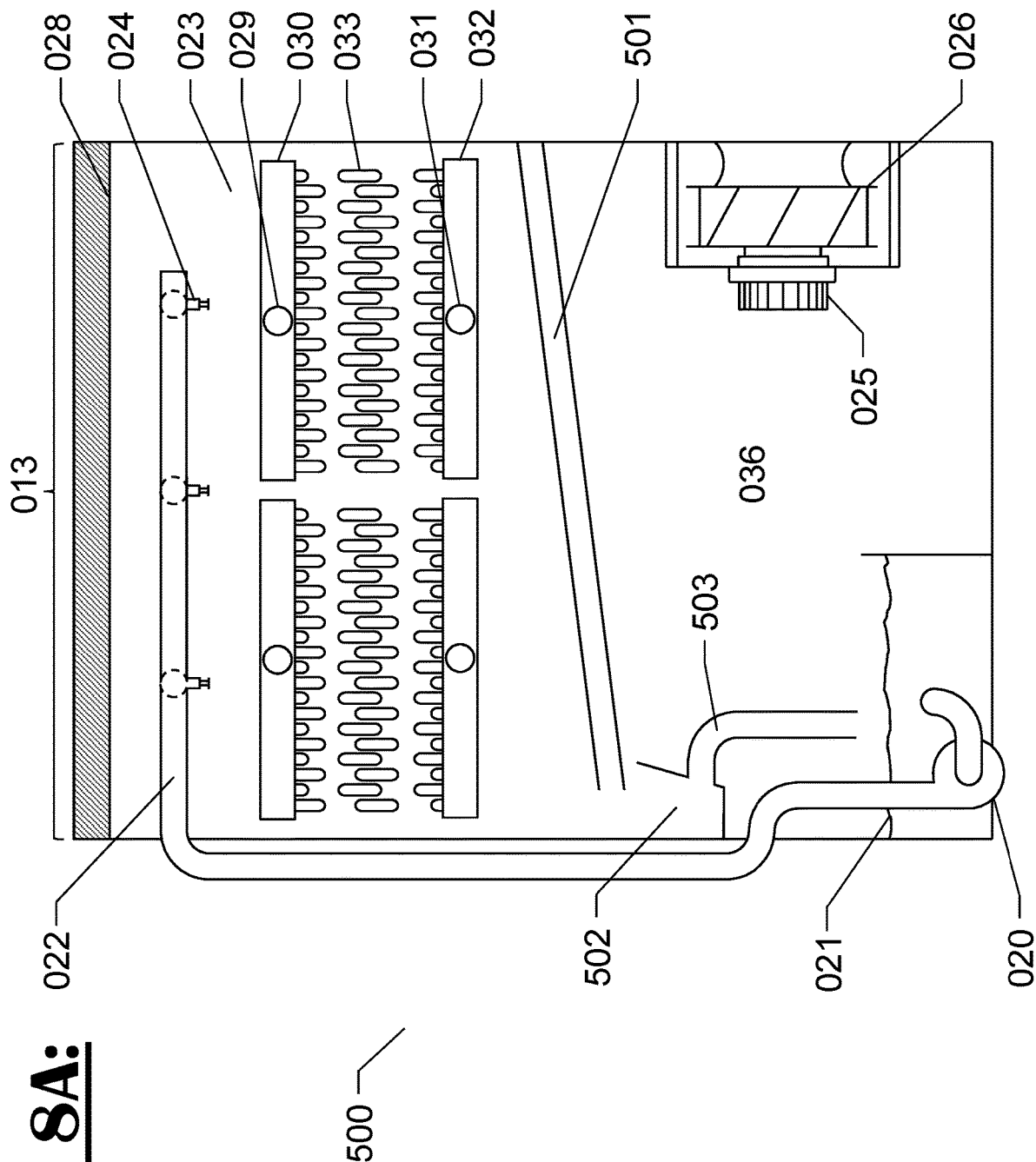

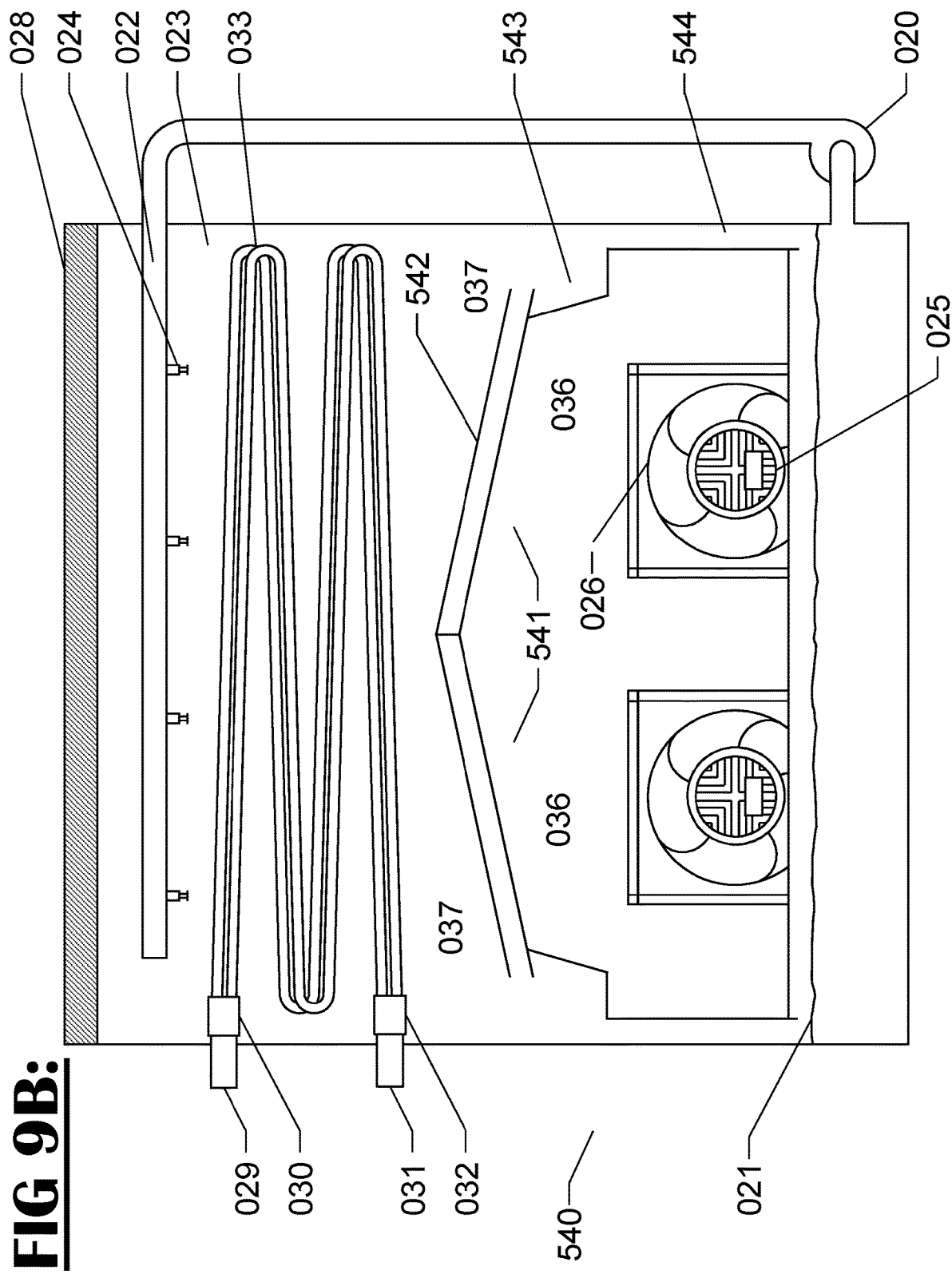

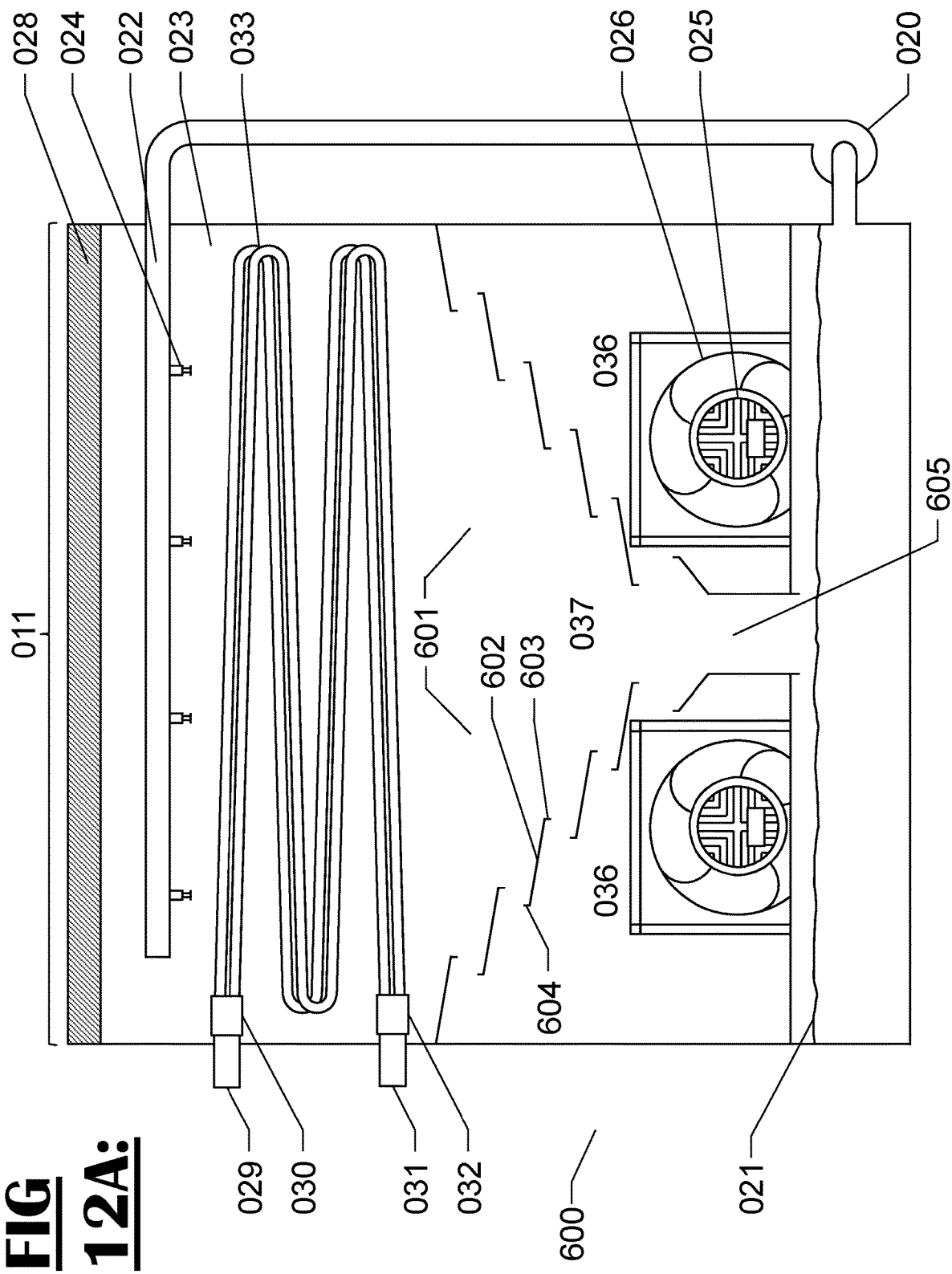

WATER COLLECTION/DEFLECTION ARRANGEMENTS

RELATED APPLICATIONS

The application claims benefit of U.S. provisional application 62/402,038, filed Sep. 30, 2016, the entirety of which is hereby incorporated herein by reference.

BACKGROUND AND SUMMARY OF THE INVENTION

This invention concerns evaporative cooling towers, fluid coolers and evaporative condensers, and specifically the amelioration of the air and spray water flow within the evaporative cooling equipment. This invention improves air distribution while reducing airflow resistance to increase the thermal capacity for a given footprint of the evaporative cooling tower. In addition, this invention seeks to provide self-cleaning, easy to access, inspect and maintain evaporative cooling equipment.

The improvement in airflow distribution, and decrease in airflow resistance, is achieved by reducing the amount of obstruction and turns in the airflow path, and by opening the plenum area around the fan. Typical forced draft evaporative cooling equipment with side inlet fans have uneven airflow distribution to the heat exchanger arranged above the fan. Solid baffles or fan housings are typically arranged to shield the mechanical and fan components from the falling water droplets through the heat exchanger. Given the near perpendicular arrangement of the entering air velocity provided by the fan, the turning losses to the heat exchanger significantly contribute to the total static pressure acting against the fan and increased fan energy consumption for a given airflow. For forced draft evaporative cooling equipment using an unhoused fan, the fans and fan plenum are separated from the heat exchanger for water management concerns, and are not positioned directly under the heat exchanger section, resulting in poor fan performance due to higher airflow resistance, large unit footprint and higher unit cost due to the side-by-side heat exchanger and fan sections.

In this invention, overlapping gutters water collection systems, as well as overlapping sloped panel water systems, are introduced to improve airflow distribution and decrease airflow resistance, thus increasing unit capacity.

The overlapping gutter water collection systems are designed to collect the spray water flowing from the top side, while letting air flow vertically through from the bottom side. The system is made of single-piece gutter assemblies stacked side by side and overlapping, which typically only cover part of the footprint of the unit, which allows for fine balancing of the airflow resistance and greater control of the airflow paths through the units. By covering only part of the unit footprint, and by being sloped, the water collection systems create a water cascade from the water collection channels to the sump. The cascading water is mixed with air passing through which becomes an extended rain zone, which allows for additional cooling of the spray water resulting in higher unit thermal performance. However, some designs require the complete footprint of the unit to be covered by the overlapping gutter water collection systems. One improvement of the invention presented is that the sloped overlapping water gutter collection system assemblies are composed of two water collection channels: a primary water collection channel that collects most of the spray water, and a secondary water collection channel that collects the remaining spray water. Both channels should be wide enough to prevent clogging due to debris and other factors, and to be easily inspected and cleaned, as needed. The air passages of the gutter assemblies are designed to minimize airside pressure drop while improving water collection performance. Drip edges can be added to improve water catching performance, as necessary. If water splash out is a concern, a water collection trough can be incorporated in the design, at the discharge side of the water collection channels of the gutter system. The spray water is collected in the trough, so it can drain to the sump via a pipe, under the action of gravity, reducing the amount of water splashing in the sump. In addition, louvers can be added under the water collection system to isolate the sump area from the fan area. If high water collection capacities are required, a design with three integrated water collection channels can be used. The gutter assemblies could be parallel or perpendicular to the direction of the air intake, depending on the needs of the application. In some embodiments, overlapping water gutter collection systems can also function as water silencers by catching most or some of the spray, shortening the waterfall distance from the heat exchanger to the sump.

The overlapping sloped panel water management systems are designed to allow air generated from the fan to pass between panels to the heat exchanger, and to catch water droplets falling from the heat exchanger and direct them to the sump. The air passages of the sloped panel assemblies are designed to minimize airside pressure drop while improving water collection performance. This allows for reduced airflow resistance from turning losses and airflow obstructions, reducing fan energy consumption, and improving thermal performance. For most embodiments presented, sloped panel assemblies only cover part of the footprint of the unit, which allows for fine balancing of the airflow resistance and greater control of the airflow paths through the units. By covering only part of the unit footprint, the water management systems can create a water cascade from the water collection channels to the sump. The cascading water creates an extended rain zone which allows for additional cooling of the spray water resulting in higher unit thermal performance. The water management panels could be parallel or perpendicular to the direction of the air intake, depending on the needs of the application.

The hygiene, self-cleaning, easy to access, easy to inspect and easy to maintain aspects of this invention are realized by the overlapping gutters and sloped panels protecting mechanical components from falling water from the heat exchanger, allowing dry internal access between the sump and the fan for inspection and maintenance, even when water is falling. In addition, overlapping gutters and sloped panels are at an angle, typically greater than 0° and less than 80°, with optimal angle between 1° and 5°, to increase water velocity and drainage, resulting in a self-cleaning system. The slope also results, in some embodiments, in water cascading in the sump. This high velocity water stream can increase water movement in the sump, thus reducing the risk of biological growth from stagnant sump areas. In addition, a cleaning system could be integrated to the water collection gutter designed, providing a pressurized and gravity driven water stream to flush out the water collection channels. Finally, keeping the spray water as far away from the air intake as possible greatly reduces to risk of water splashing out through the fan, and the risk of freezing in the winter, especially when the fans are not in operation.

For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

BRIEF DESCRIPTION OF THE DRAWINGS

In the drawings:

FIG. 4A is a perspective view of an overlapping gutter water collection system in accordance with a fifth embodiment of the present invention;

FIG. 4B is a perspective view of a gutter assembly of an overlapping gutter water collection system in accordance with a fifth embodiment of the present invention;

FIGS. 6A and 6B are front and side views of a sub-section of an overlapping gutter water collection system in accordance with a fourteenth and fifteenth embodiment of the present invention;

FIGS. 8A, 8B, and 8C are side views of an evaporative indirect heat exchanger product in accordance with a seventeenth, eighteenth and nineteenth embodiment of the present invention;

FIGS. 9A and 9B are back and side views of an evaporative indirect heat exchanger product in accordance with a twentieth and twenty-first embodiment of the present invention;

FIGS. 12A and 12B are back side views of an evaporative indirect heat exchanger product in accordance with a twenty-sixth and twenty-seventh embodiment of the present invention;

DETAILED DESCRIPTION

Figure 1A:
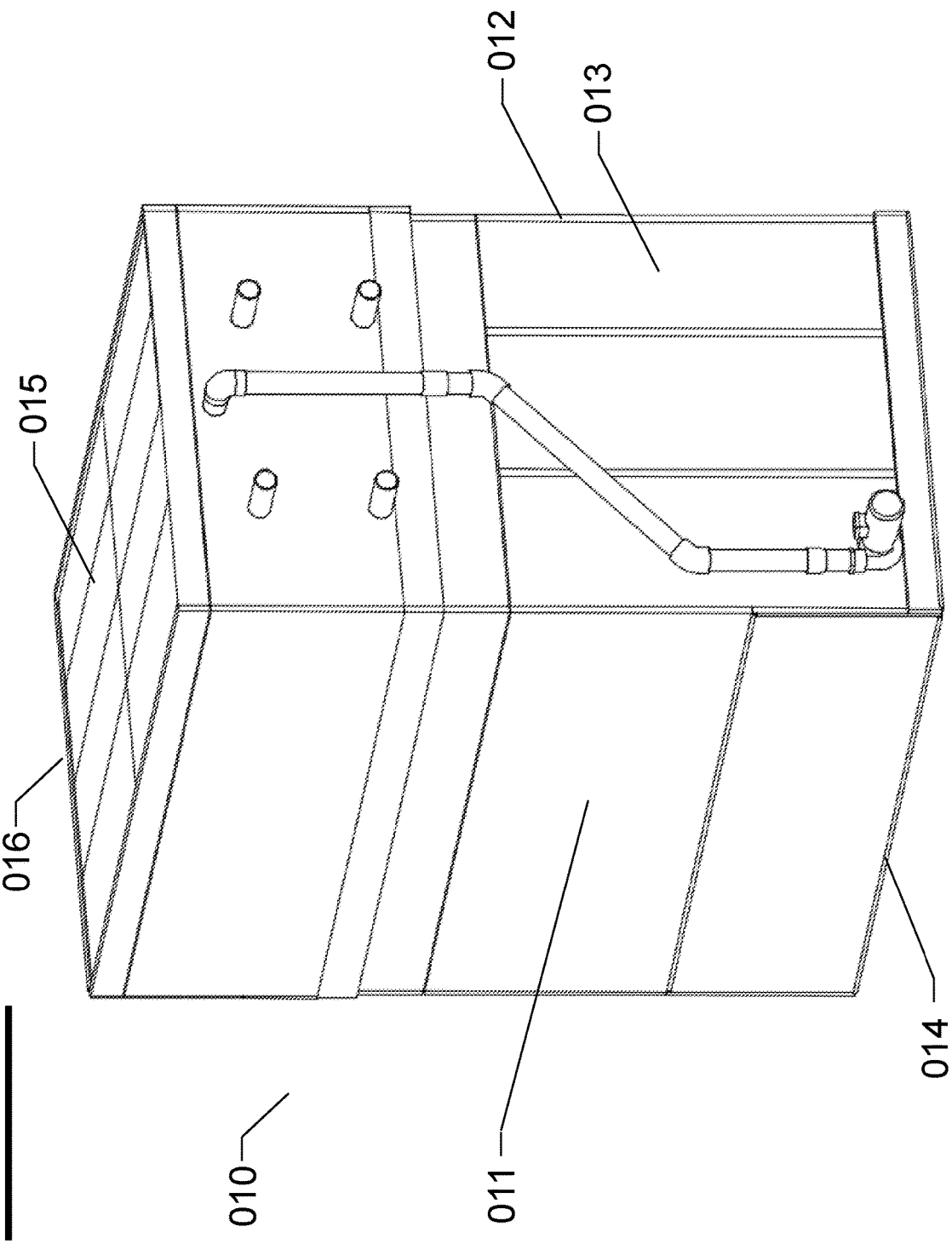
FIG. 1A is a perspective view of an evaporative indirect heat exchanger product in accordance with a first embodiment of the present invention.

Referring now to the Figures and particularly FIG. 1A, an evaporative indirect heat exchanger product apparatus generally designated by 010 is shown. The apparatus has four vertical sides that include a connection end 013, an opposite to connection end 016, an air inlet end 012, and an opposite to air inlet end 011. The apparatus also has a bottom end 014 and a top air discharge end 016.

Figure 1B:
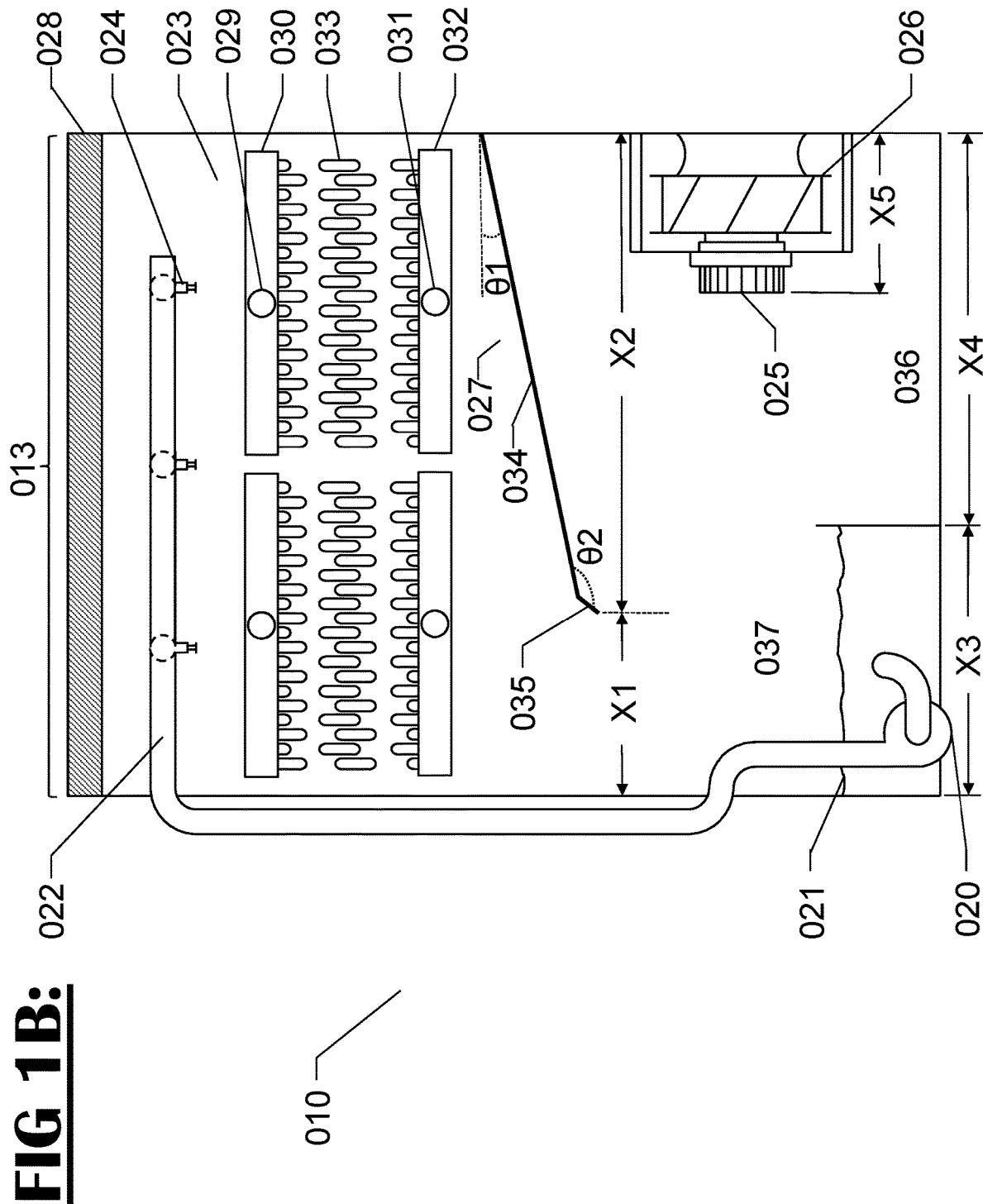
FIG. 1B is a side view of an evaporative indirect heat exchanger product in accordance with a first embodiment of the present invention.

Now referring to FIG. 1B, the main internal and external components are better identified from a side sectional view of connection end 013. Hot process fluid may enter indirect heat exchanger 023 from top inlet connection(s) 029 to be distributed through top heat exchanger header 030 through serpentine tube circuits 033 to be collected by bottom header exchanger header 032 to leave cooled process fluid exiting through bottom outlet connection(s) 031. Process fluid is indirectly cooled from air forced through heat exchanger by fan 026 and cooled water collected from sump 021 by pump 020 to be distributed to top of heat exchanger through piping 022 and spray nozzles 024. An eliminator section 028 is typically installed above spray nozzles 024 to remove water from the air discharge. As shown in FIG. 1B, embodiment 010 is an evaporative indirect heat exchanger product which could be a closed circuit cooling tower or an evaporative condenser, with water and air solid divider baffle 027, in accordance with the first embodiment of the present invention. The water and air solid divider baffle 027 only extends through part of the unit. The water collected by the solid baffle flows towards sump 021 under the effect of gravity, via sloped panel 034. The slope of panel 034, defined by angle $\theta 1$, is typically greater than 0° and less than 80°, with optimal angle $\theta 1$ between 1° and 5°. Water freely cascades off optional drip edge 035 into sump 021 under the effect of gravity. The angle $\theta 2$ between the sloped panel 034 and optional drip edge 035, is typically between 90°−$\theta 1$, and 180°. Water and air solid divider baffle 027 length X2 and sump 021 width X3 can be adjusted so that the overlap between water and air solid divider baffle 027 and sump 021, X2-X4, is greater than 0 inches, and ideally greater than 5 inches, to ensure that no water reaches dry area 036, especially when the fan 026 is rotating slowly or is not in operation. Additionally, sump 021 width X3 can be adjusted to optimize the ratio between dry region 036 and wet region 037. Moreover, to ensure easy access to the dry area 036 for inspection, cleaning and maintenance, open dry area width X4-X5 should be at least 24 inches. FIG. 1B is shown with unhoused centrifugal fan 026 forcing or pushing air through the unit. The actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, belt drive, or gear drive. Note that for most embodiments presented, evaporative cooling equipment is in forced draft, single-sided air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment. The second, third, and fourth embodiments are shown in FIGS. 1C, 1D and 1E, respectively with similar components numbered the same as FIG. 1B.

Figure 1C:
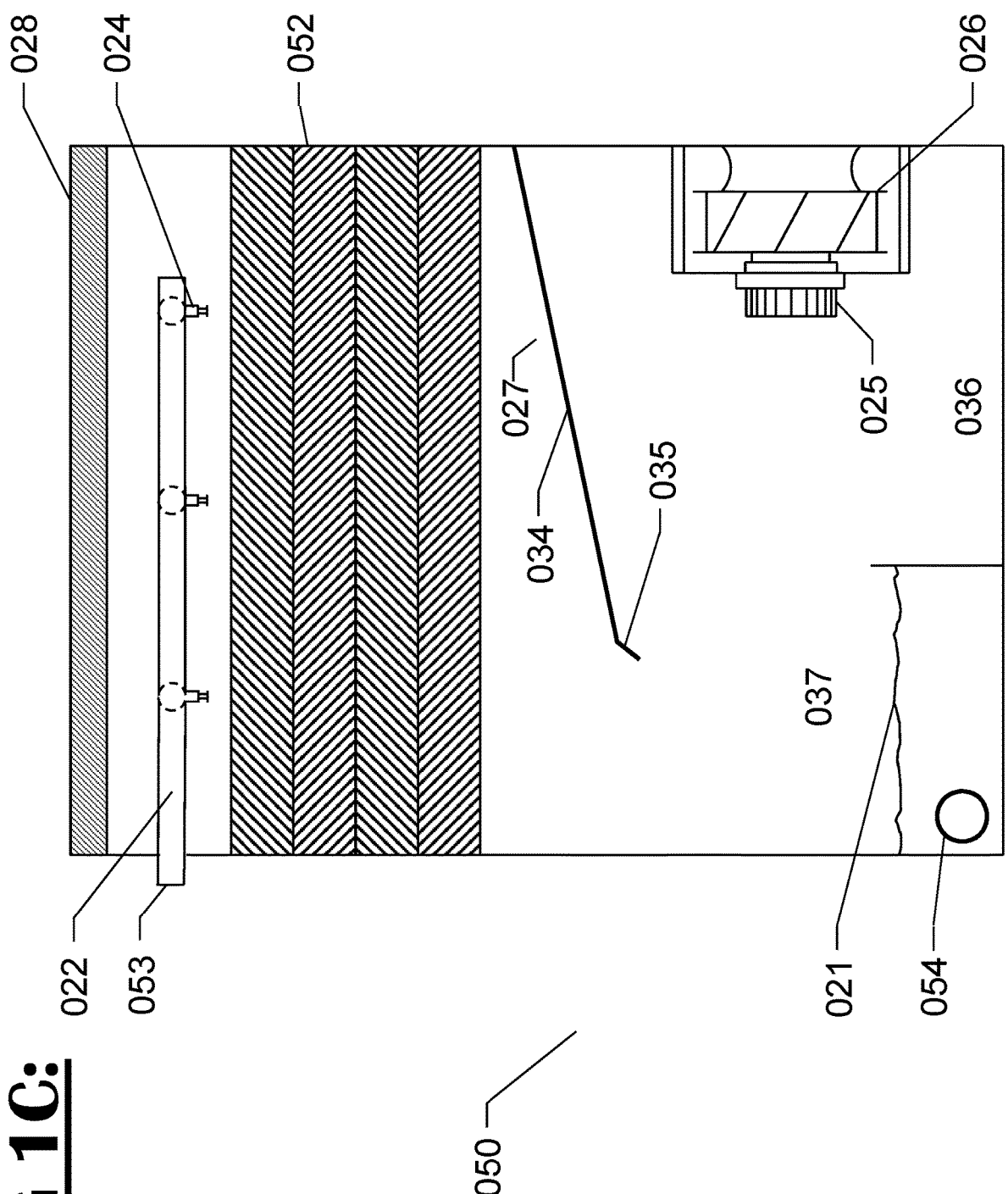
FIG. 1C is a side view of an evaporative direct heat exchanger product in accordance with a second embodiment of the present invention.

As shown in FIG. 1C, embodiment 050 is an open cooling tower with a direct heat exchanger section 052, which usually is comprised of fill sheets, with a water and air solid divider baffle 027, in accordance with a second embodiment of the present invention. Operation of the embodiment in FIG. 1C is similar to the operation of the embodiment in FIG. 1B.

Figure 1D:
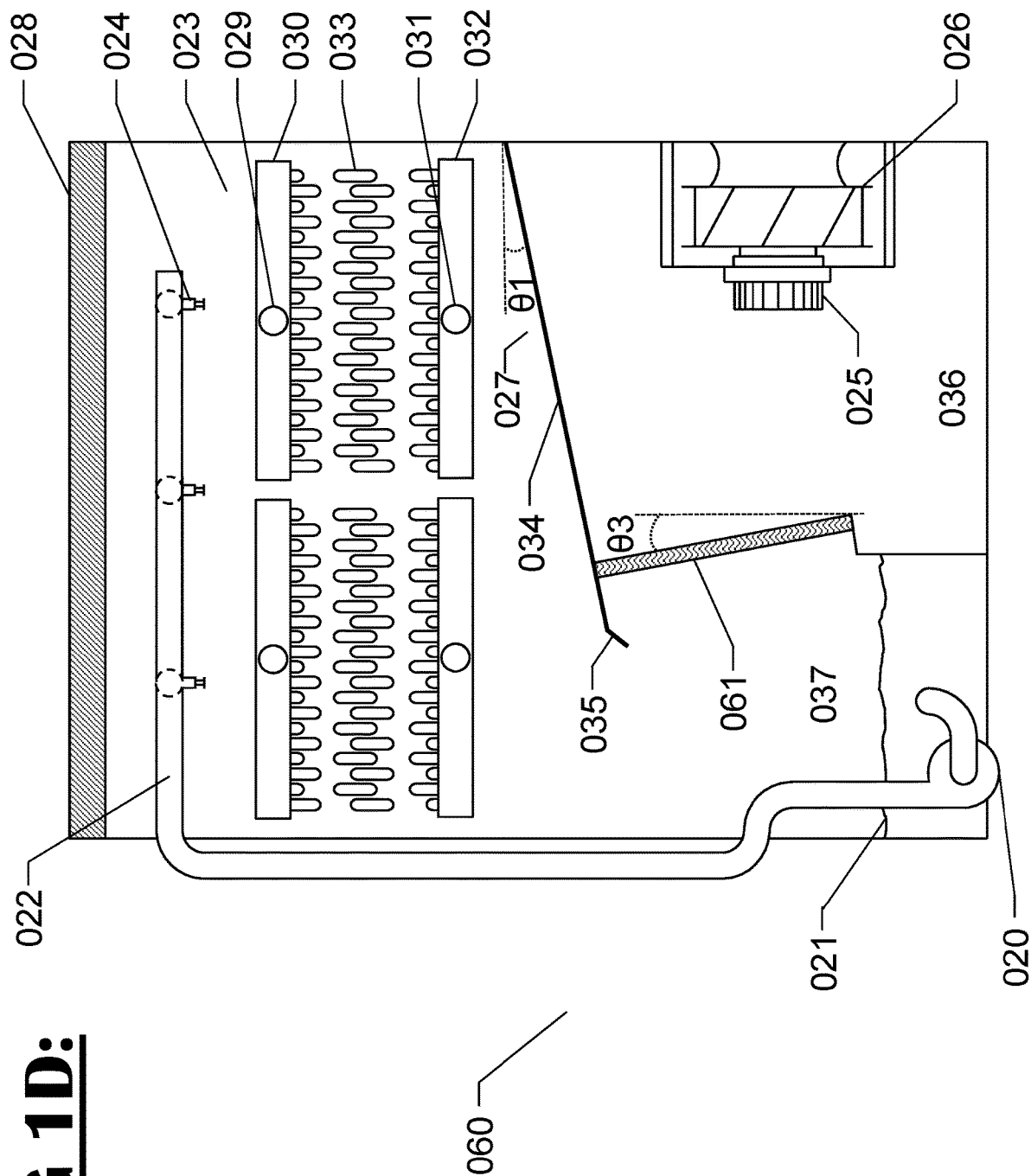
FIGS. 1D and 1E are side views of an evaporative indirect heat exchanger product in accordance with a third and fourth embodiment of the present invention.
Figure 1E:
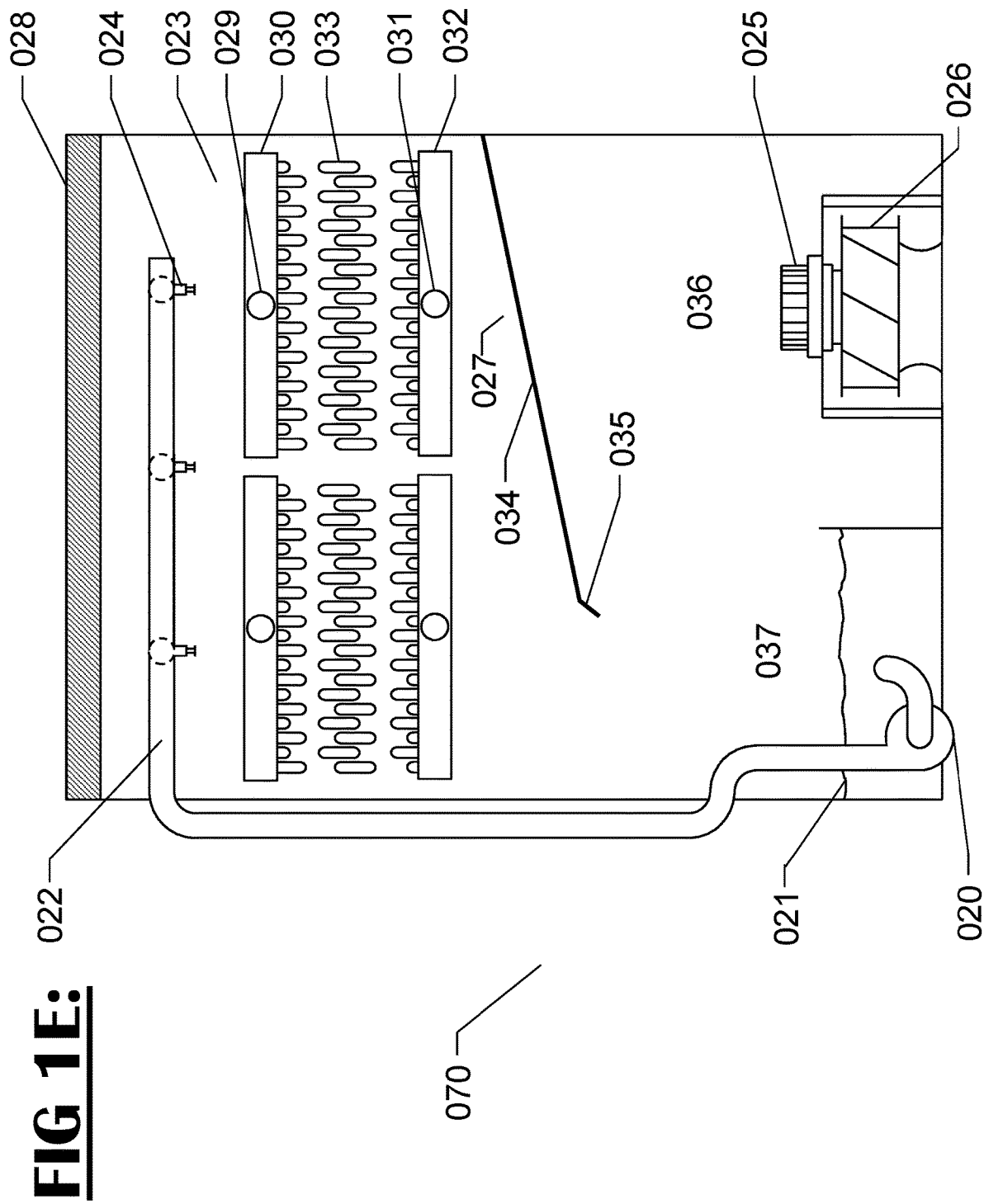

To further increase water management efficiency of the first and second embodiments shown in FIGS. 1B and 1C, third embodiment 060 is shown in FIG. 1D with louvers 061 extending from solid divider baffle 027 to water collection sump 021. The use of louvers 061 in the opening between the sloped solid divider baffle 034 and the sump 021 is designed such that virtually no water will reach the dry area surrounding the motor 025 and fan 026, and negates, or at the very least limits, the need for optional drip edge 035. The angle θ3 between solid divider baffle 027 and louvers 061 is typically less than 90°+θ1, to guarantee that no water can get to the dry area 036 through the louvers 061. The fourth embodiment 070 is shown in FIG. 1E with fan 026 arranged with air intake on the bottom of the unit operates in a manner similar to that of FIG. 1D.

Figure 2A:
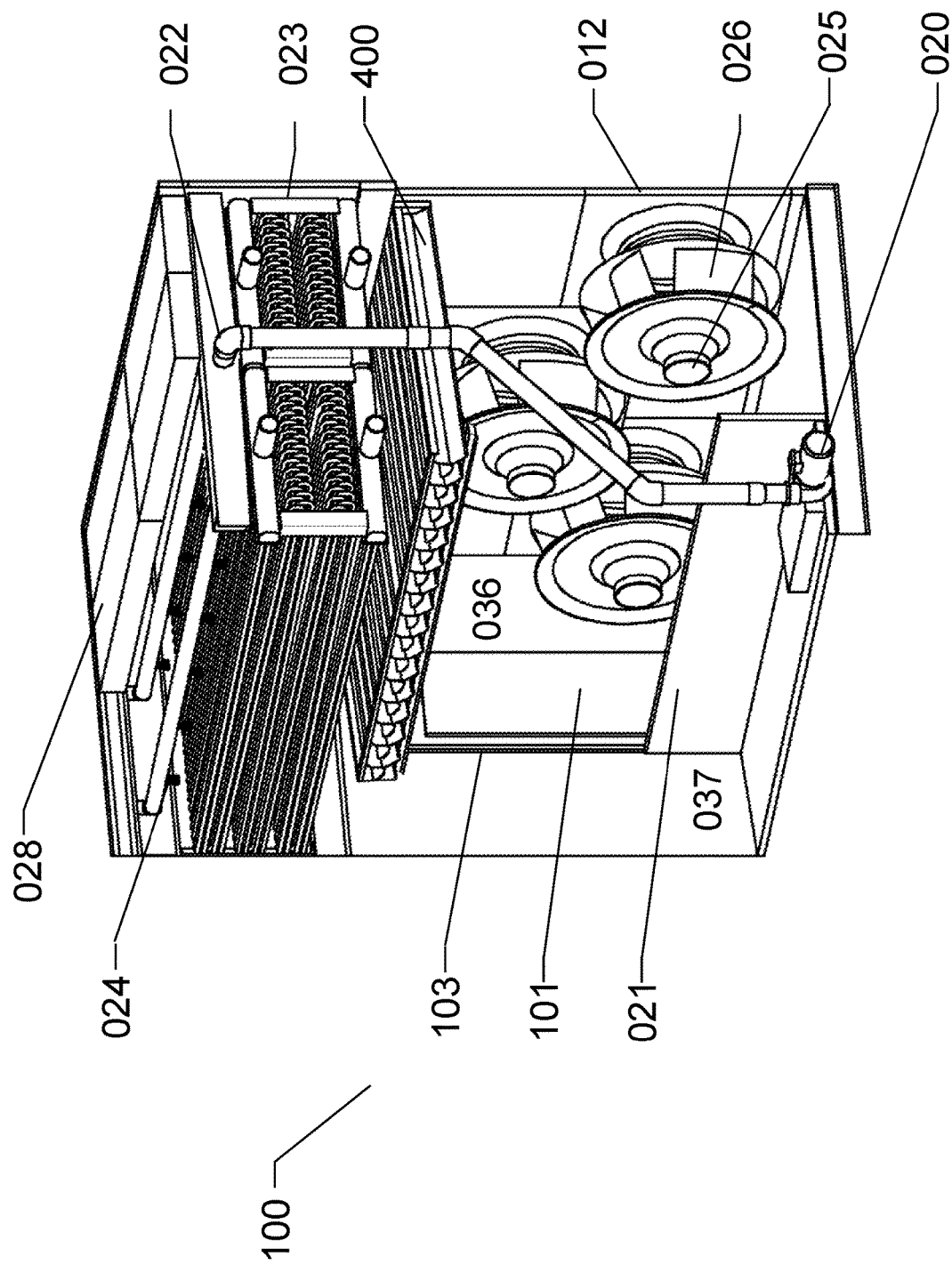
FIG. 2A is a perspective view of an evaporative indirect heat exchanger product in accordance with a fifth embodiment of the present invention.
Figure 2B:
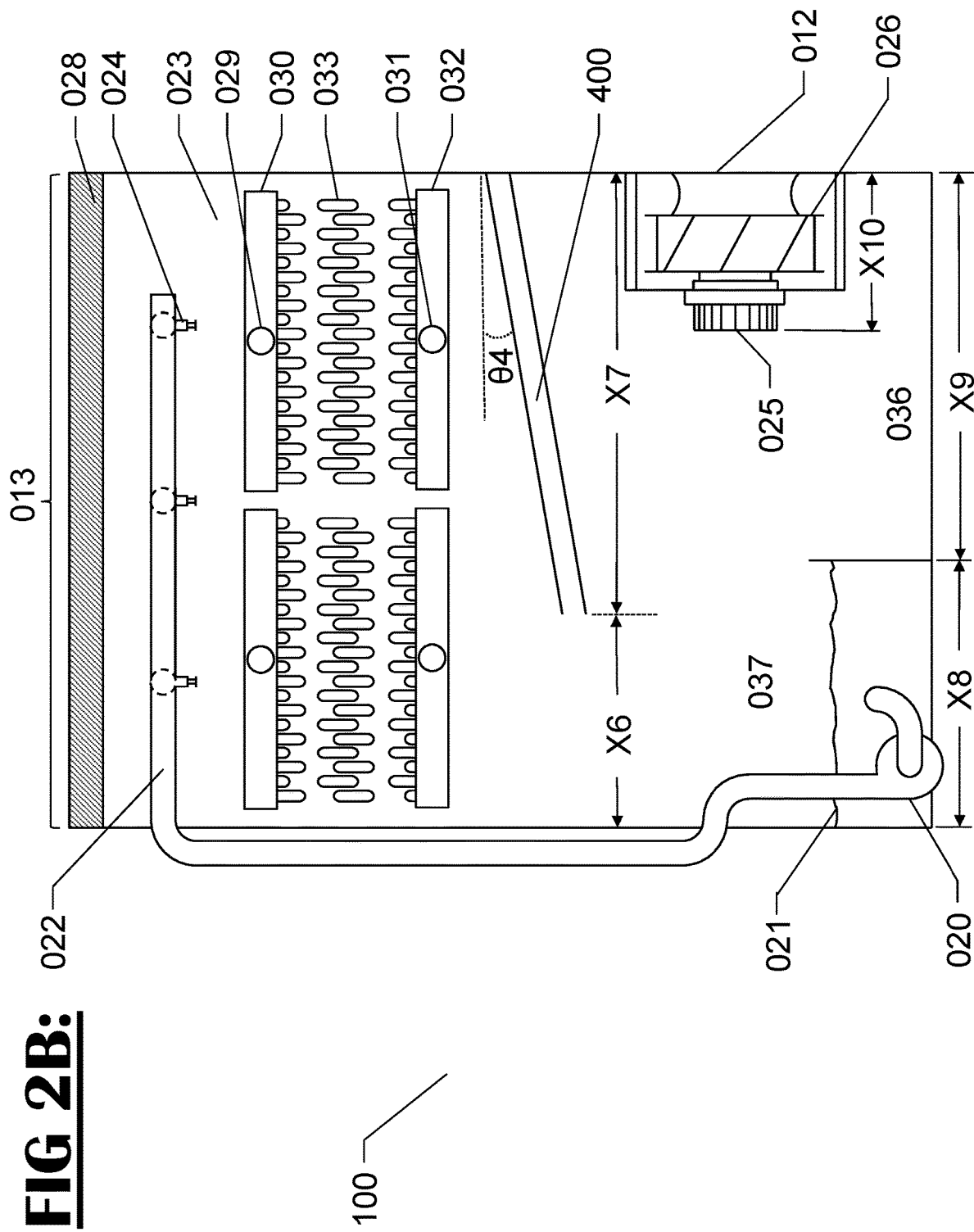
FIG. 2B is a side view of an evaporative indirect heat exchanger product in accordance with a fifth embodiment of the present invention.
Figure 2C:
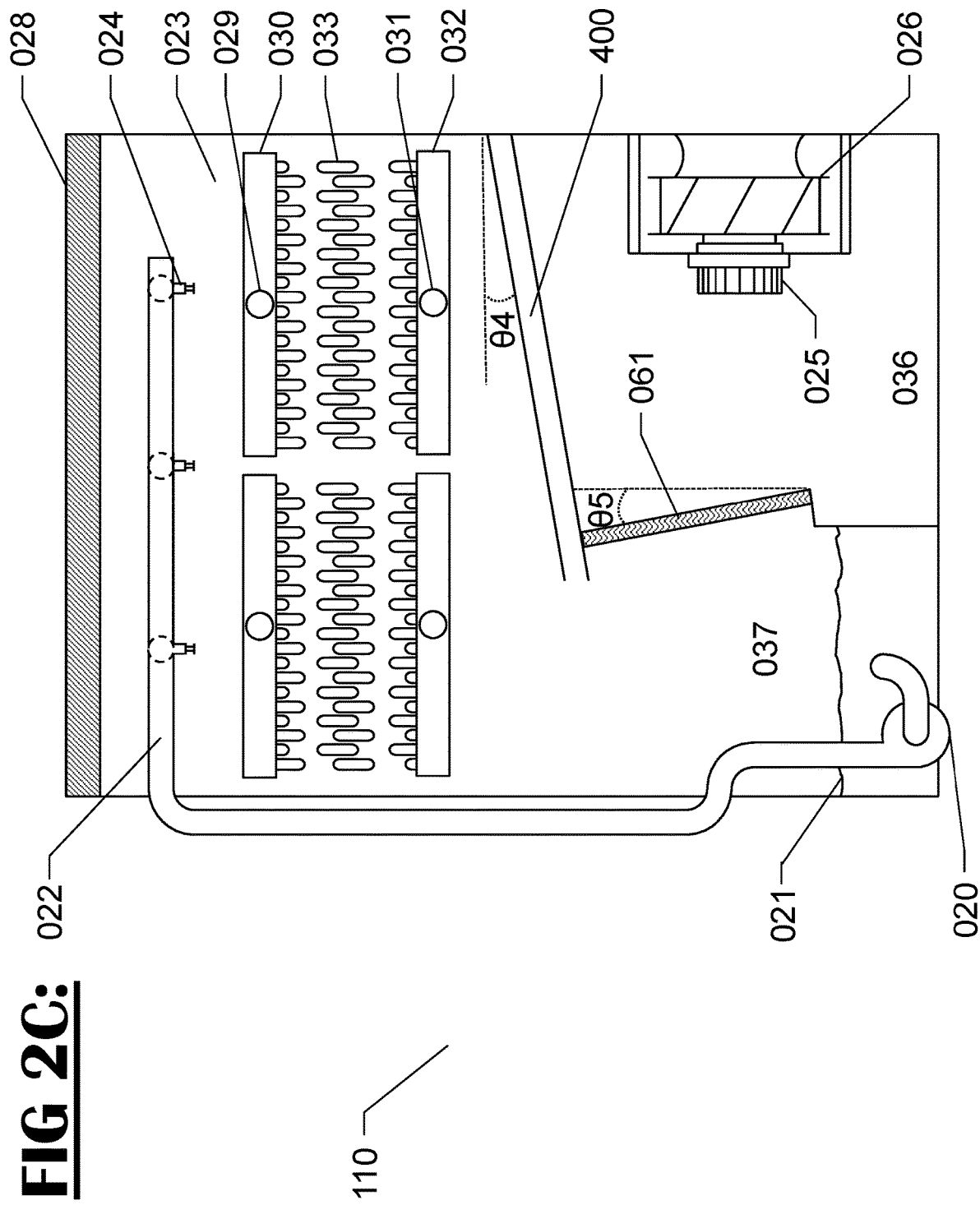
FIGS. 2C, 2D, and 2E are side views of an evaporative indirect heat exchanger product in accordance with a sixth, seventh and eighth embodiment of the present invention.
Figure 2D:
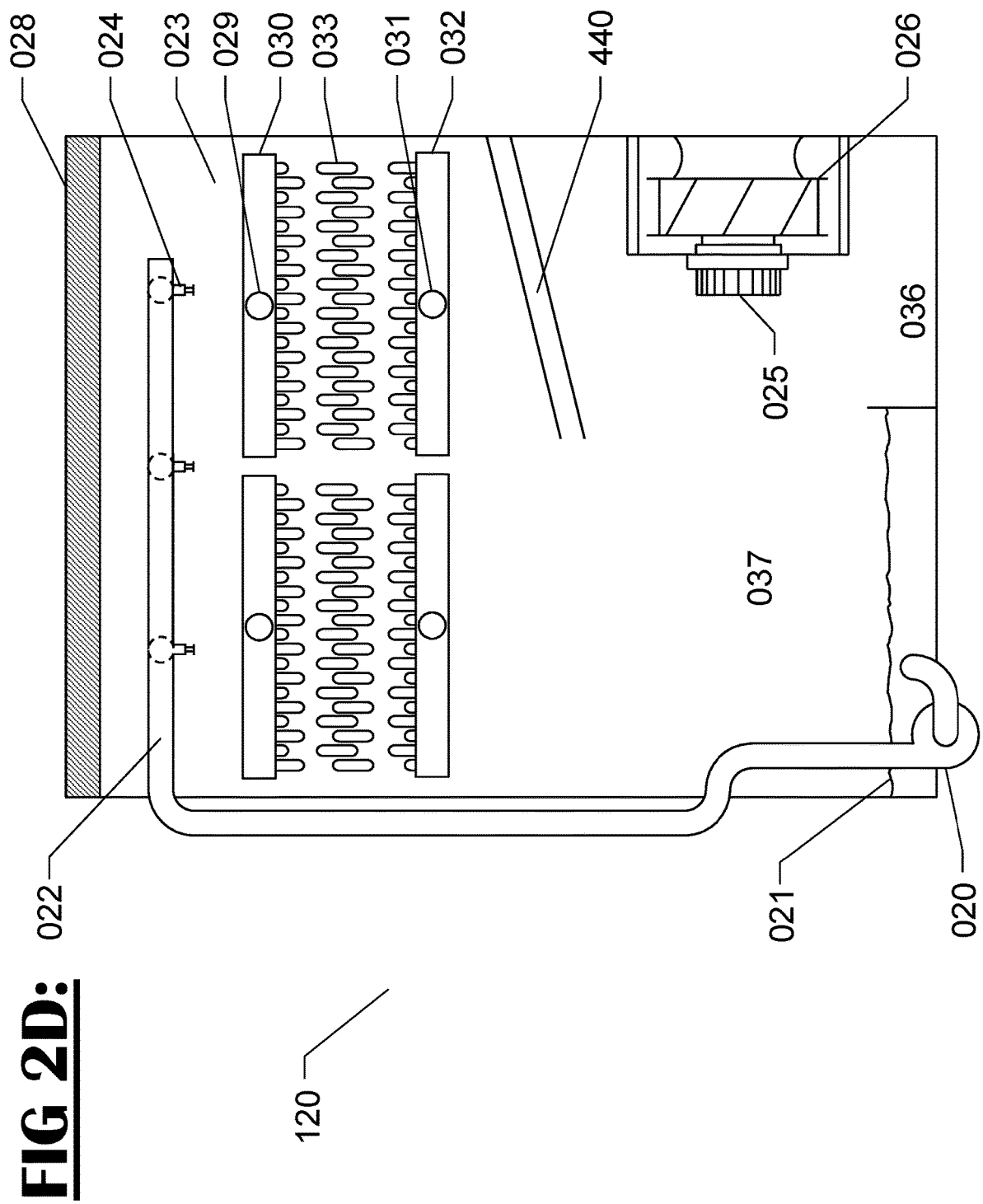
Figure 2E:
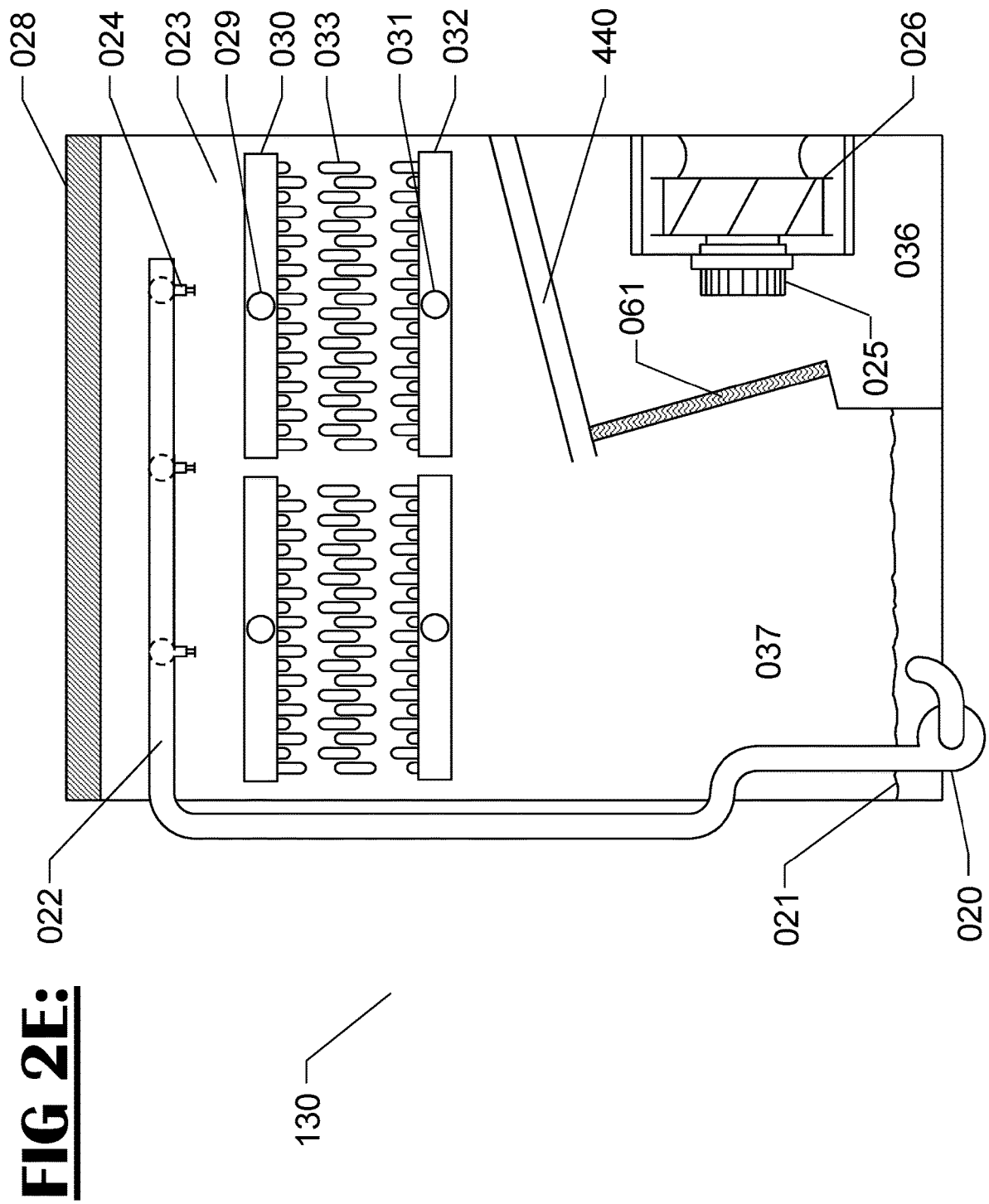

A fifth embodiment is shown in FIGS. 2A and 2B, and a sixth, seventh, and eighth embodiment is shown in FIGS. 2C, 2D, and 2E, respectively. Similar components are numbered the same as in FIG. 1B. As shown in FIG. 2A, embodiment 100 is an evaporative indirect heat exchanger product which could be a closed circuit cooling tower or an evaporative condenser, with an overlapping gutter water collection system 400, in accordance with a fifth embodiment of the present invention. However, the length X7 of overlapping gutter water collection system and width X8 of sump 021 in present embodiment would allow for a minimum distance, X9-X10 of 24 inches for maintenance access to dry area 036 via an optional door 101 as shown in FIG. 2A. Although FIG. 2A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Further, the number and position (e.g. staggered or aligned) of the fans is not a limitation of the embodiments presented. Additionally, motor 025 may be directly connected to the fan 026 as shown, belt drive, or gear drive. Furthermore, it should be understood that indirect heat exchangers are not a limitation to embodiments presented. As shown in FIG. 2B, when viewed from sectional view of connection end 013 the overlapping gutter water system 400 (show 400 with solid lines) extends from the fan inlet end 012 and shadows part of the sump 021, such that distance X7 is greater than distance X9. Distance X7-X9, is greater than 0 inch, and ideally greater than 5 inches, to assure that virtually no water reaches dry area 036, especially when the fan 026 is rotating slowly or is not operating. The overlapping gutter water system 400 is sloped such that water freely flows towards and cascades into sump 021 under the effect of gravity. The slope of overlapping gutter water system 400, defined by angle θ4, is typically greater than 0° and less than 80°, with optimal angle θ4 between 1° and 5°. For most embodiments presented, evaporative cooling equipment is in forced draft, single-sided air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

A sixth embodiment 110 of the present invention is shown in FIG. 2C. The six embodiment 110 describes an alternative arrangement to that of the fifth embodiment 100 shown in FIGS. 2A and 2B, with louvers 061 separating the dry region 036 and wet region 037. The use of louvers 061 in the opening between the sump and the overlapping gutter water system 400 assures that virtually no water will reach the dry area surrounding the motor 025 and fan 026, ensuring a clean and safe environment around the fans for easy access and maintenance. The angle θ5 between overlapping gutter water system 400 and louvers 061 is typically less than 90°+θ4, to assure that virtually no water can get to the dry area 036 through the louvers 061.

A seventh embodiment 120 of the present invention is shown in FIG. 2D. The seventh embodiment 120 describes an alternative arrangement to that of the fifth embodiment 100 shown in FIGS. 2A and 2B. Embodiment 120 is an evaporative indirect heat exchanger product which could be a closed circuit cooling tower or an evaporative condenser, with an overlapping gutter water collection system 440, in accordance with a seventh embodiment of the present invention. The length of overlapping gutter water collection system in present embodiment is designed to protect fan 026 and motor 025 in dry area 036 as shown in FIG. 2D.

The eighth embodiment 130 of the present invention is shown in FIG. 2E. The eighth embodiment 130 describes an alternative arrangement to that of the seventh embodiment 120 shown in FIG. 2D, with louvers 061 separating the dry region 036 and wet region 037. The use of louvers 061 in the opening between the sump and the overlapping gutter water system 440 assures that virtually no water will reach the dry area surrounding the motor 025 and fan 026, ensuring a clean and safe environment around the fans for easy access and maintenance.

Figure 3A:
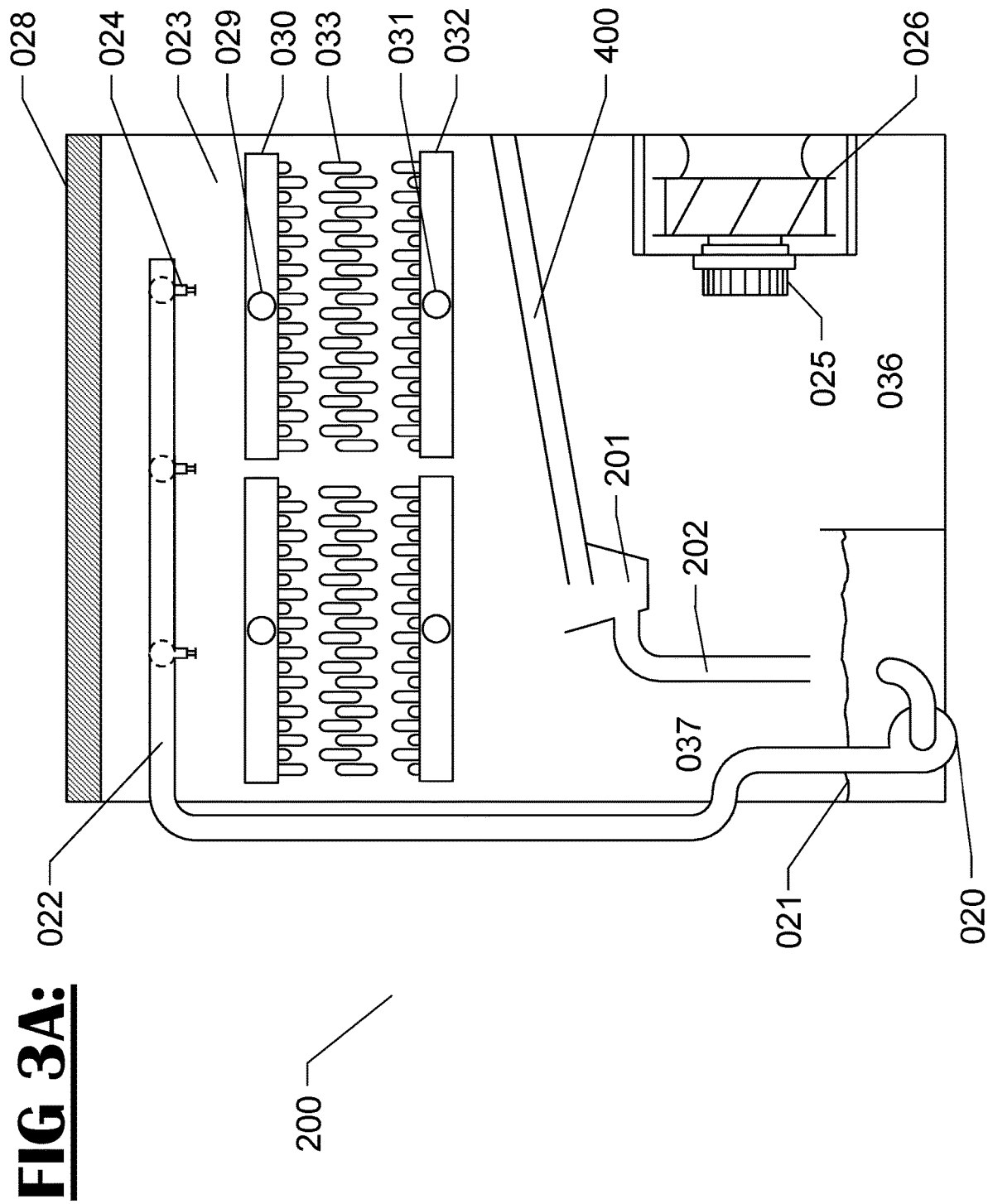
FIGS. 3A, 3B, 3C, and 3D are side views of an evaporative indirect heat exchanger product in accordance with a ninth, tenth, eleventh and twelfth embodiment of the present invention.

A ninth, tenth, eleventh and twelfth embodiment is shown in FIGS. 3A, 3B, 3C and 3D, respectively with similar component numbered the same as FIG. 1B. As shown in FIG. 3A, embodiment 200 is an evaporative indirect heat exchanger product which could be a closed circuit cooling tower or an evaporative condenser, with an overlapping gutter water collection system 400, in accordance with a ninth embodiment of the present invention. Gutter assemblies of overlapping gutter water system 400 of embodiment 200 could be similar to that of previous embodiments. Although FIG. 3A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, be belt drive, or gear drive. Furthermore, it should be understood that the use of indirect heat exchangers are not a limitation to embodiments presented. As shown in FIG. 3A, the overlapping gutter water system 400 only extends through part of the footprint of the unit. The water collected by the gutter assemblies of the overlapping gutter water system 400 is funneled to a water collection trough 201, from which it will drain to the sump 021 under the effect of gravity, via a drain 202. Additionally, overlapping gutter water system 400 design, and sump 021 width can be adjusted to optimize the ratio between dry region 036 and wet region 037. Finally, it should be understood size and of the water collection trough 201, as well as the length and nature of the drain 202, the type and size of the louvers 061 and the width and depth of the sump 021, are not a limitation of the present embodiment. For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

Figure 3B:
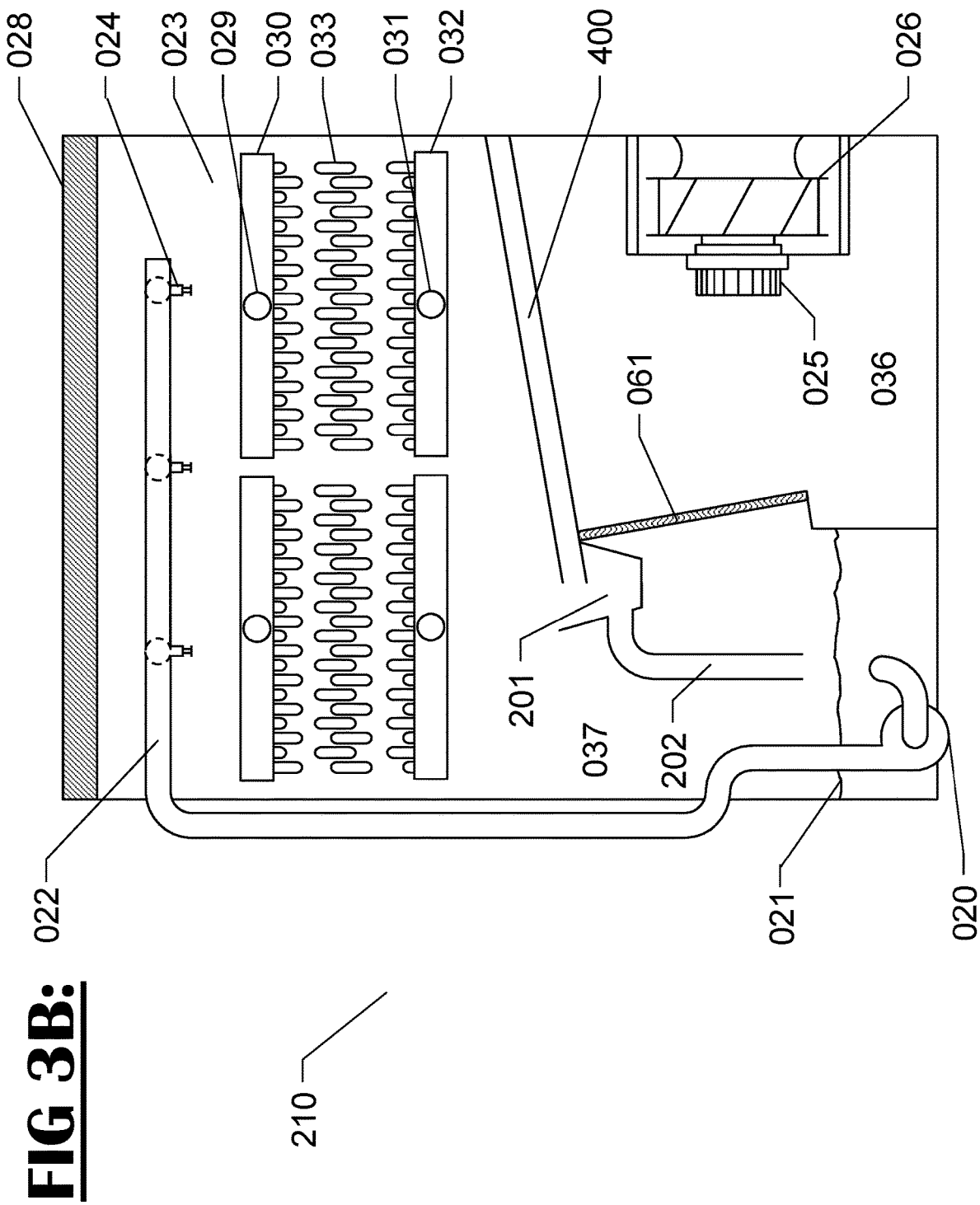

A tenth embodiment 210 of the present invention is shown in FIG. 3B. The tenth embodiment 210 describes an alternative arrangement to that of the ninth embodiment 200 shown in FIG. 3A, with louvers 061 now separating the dry region 036 and wet region 037. The use of louvers 061 in the openings between sloped panels assures that virtually no water will reach the dry area surrounding the motor 025 and fan 026, ensuring a clean and safe environment around the fans for easy access and maintenance. Although FIG. 3B is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, be belt drive, or gear drive. Furthermore, it should be understood that the use of indirect heat exchangers are not a limitation to embodiments presented. Finally, it should be understood size and of the water collection trough 201, as well as the length and nature of the drain 202, the type and size of the louvers 061 and the width and depth of the sump 021, are not a limitation of the present embodiment. Additionally, overlapping gutter water system 400 design, and sump 021 width can be adjusted to optimize the ratio between dry region 036 and wet region 037.

Figure 3C:
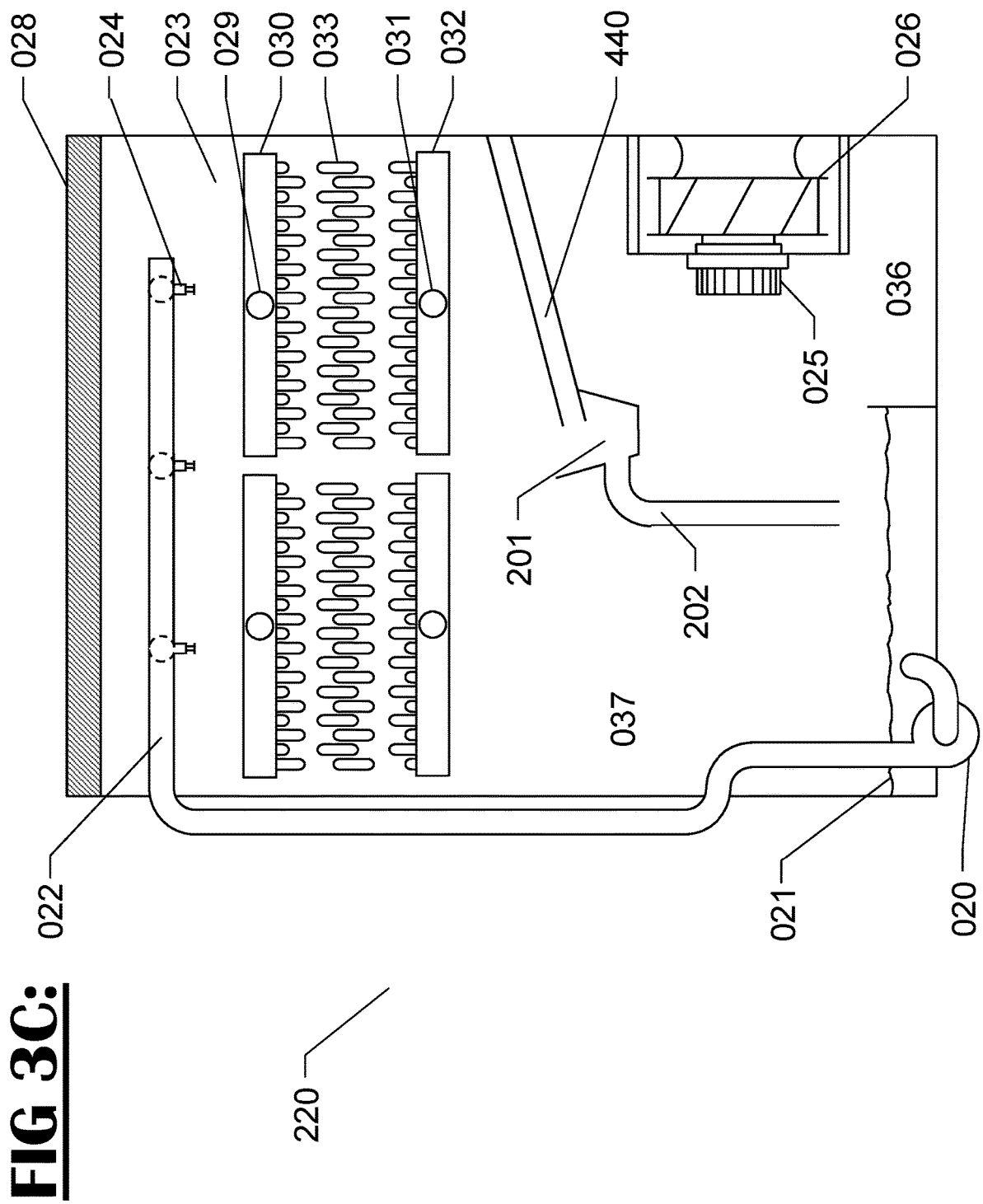
Figure 3D:
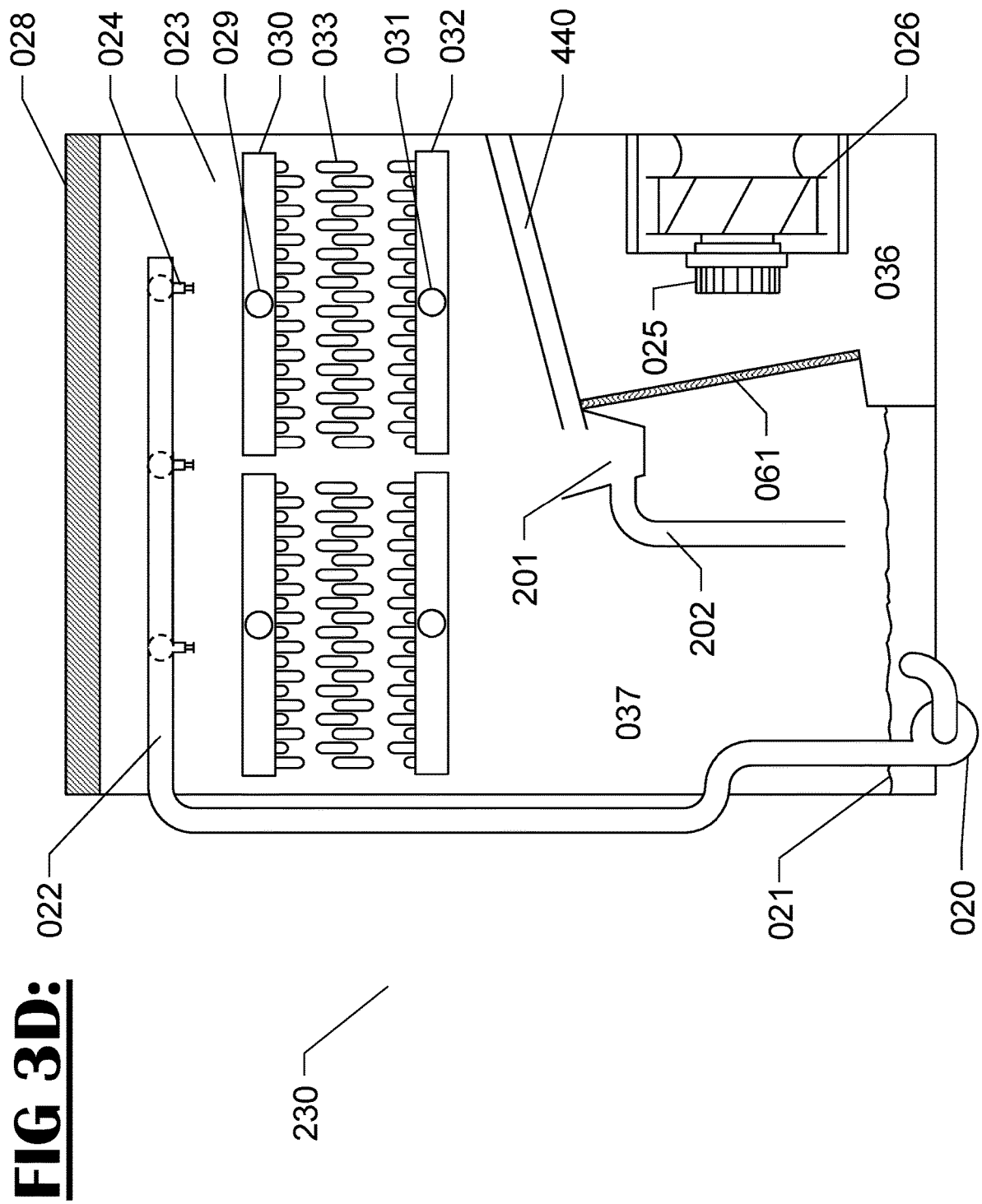

The eleventh embodiment 220 of the present invention is shown in FIG. 3C. The eleventh embodiment 220 describes an alternative arrangement to that of the ninth embodiment 200 shown in FIG. 3A. Embodiment 220 is an evaporative indirect heat exchanger product which could be a closed circuit cooling tower or an evaporative condenser, with an overlapping gutter water collection system 440, in accordance with a seventh embodiment of the present invention. The length of overlapping gutter water collection system in present embodiment would optimized to a minimum to protect fan 026 and motor 025 in dry area 036 as shown in FIG. 3C. The twelfth embodiment 230 of the present invention is shown in FIG. 3D.

The twelfth embodiment 230 describes an alternative arrangement to that of the eleventh embodiment 220 shown in FIG. 3C, with louvers 061 separating the dry region 036 and wet region 037. The use of louvers 061 in the opening between the sump and the overlapping gutter water system 440 assures that virtually no water will reach the dry area surrounding the motor 025 and fan 026, ensuring a clean and safe environment around the fans for easy access and maintenance. It should be understood size and of the water collection trough 201, as well as the length and nature of the drain 202, the type and size of the louvers 061 and the width and depth of the sump 021, are not a limitation of the present embodiment.

Referring now to FIGS. 4A and 4B, overlapping gutter water collection system 400 is in accordance with the fifth embodiment of the present invention. FIG. 4A shows a perspective view of the overlapping gutter water collection system 400. Overlapping gutter water collection system 400 is shown to be comprised of a plurality of gutter assemblies 410, side panels 411, back panel 412, bottom support channel 413, and top support channel 414. The overlapping gutter water collection system 400 is designed to span the full distance between face 013 and face 016, as defined in FIG. 1, as shown in FIG. 2A, and is supported by the side 411 and back panels 412, along with the bottom support channel 413, which are attached to the unit structure. The gap between the side 411 and back panels 412, along with the bottom support channel 413, and the unit structure is kept water tight by gasket sealing, butyl tape, and/or coating, so that the spray water does not leak through the gap, but the sealing methodology is not a limitation of the invention. Optional drip edge 415 is incorporated to the bottom support channel 413, to counteract the effects of surface tension and force the water to drain into the unit sump. The slope of the overlapping gutter water collection system 400 is typically greater than 0° and less than 80°, with optimal angle between 1° and 5°. FIG. 4B shows a perspective view of the two pieces that are part of one gutter assembly 410. Each gutter assembly 410 is composed of a primary piece 416, and a secondary piece 417, and may be attached together with rivets, through attachment holes 418. The two pieces 416 and 417 may also be welded together, extruded, or printed, and the method of manufacturing is not a limitation. The gap between primary piece 416 and secondary piece 417 is kept watertight by gasket sealing and/or coating, so that the spray water does not leak through the gap. The sealing methodology is not a limitation of the invention. In addition, the overlapping gutter water collection system 400 can be made of various metals such as stainless steel or other corrosion resistant steels and alloys. It is also possible that such gutter assemblies can be made of other materials such as aluminum or copper; various alloys, or plastics that provide corrosion resistance and strength, and are not a limitation of the invention.

Figure 4C:
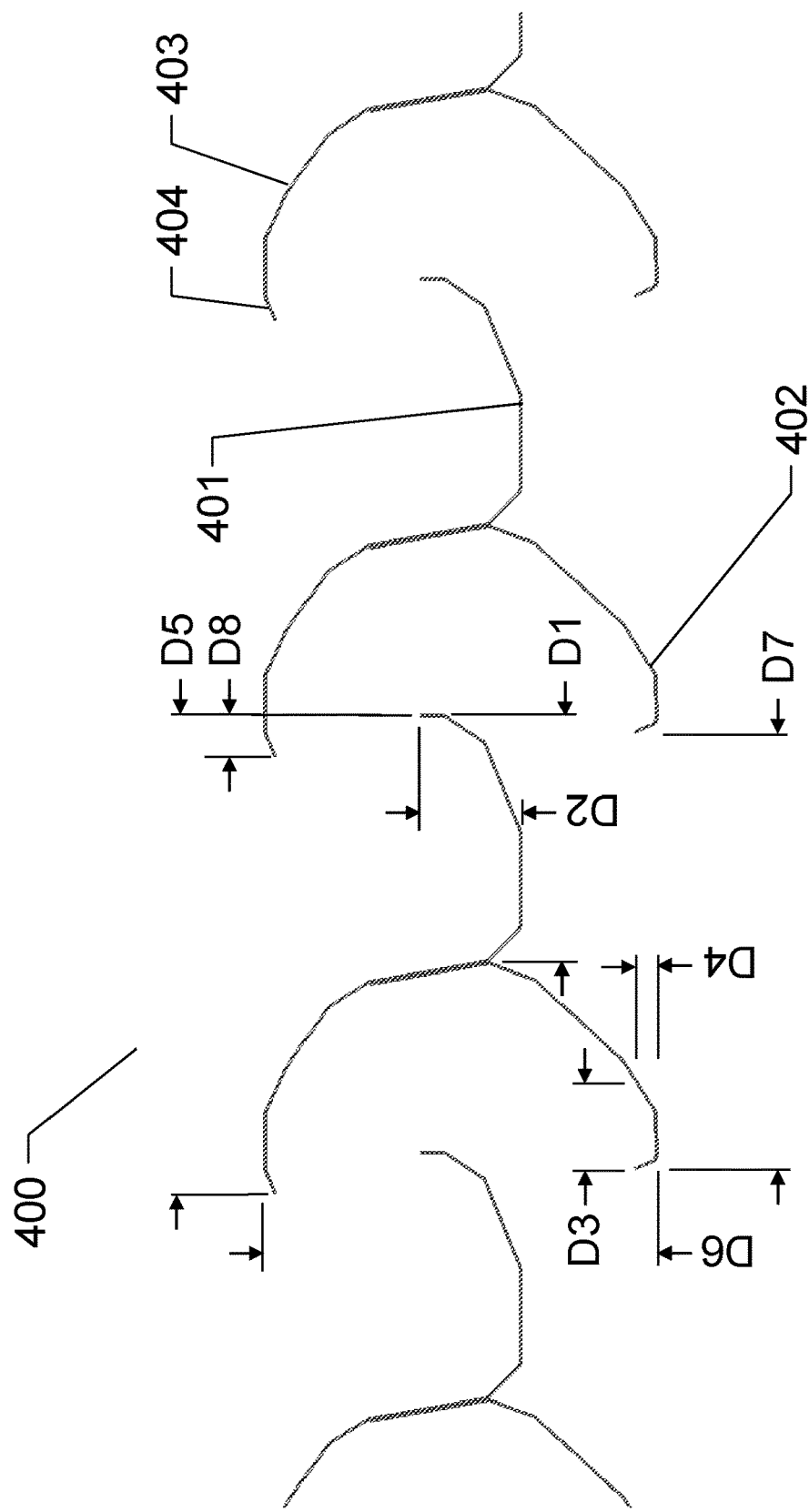
FIG. 4C is a front side view of a sub-section of an overlapping gutter water collection system in accordance with a fifth embodiment of the present invention.

FIG. 4C shows two complete and two partial sets of gutter assemblies 410 of embodiment 400. In accordance with the fifth embodiment of the present invention, overlapping gutter water collection system 400 has a primary water collection channel 401, and a secondary water collection channel 402. Primary water collection channel 401 extends into a curved deflection plate 403, to direct water flow toward primary water collection channel 401. The final section 404 of the curved deflection plate 403 points downwards to counteract the effects of surface tension and force the water to drain into the primary water collection channel 401, under the effect of gravity. Dimension D1 is typically between 0.5 inch and 12 inches. Dimension D2 is typically between 0.5 inch and 12 inches. Dimension D3 is typically between 0.5 inch and 8 inches. Dimension D4 is typically between 0.5 inch and 8 inches. Dimension D5 is typically between 5 inches and 30 inches. Dimension D6 is typically between 4 inches and 20 inches. Dimension D7 is typically between 4 inches and 20 inches. Dimension D8 is greater than 0 inch to ensure proper drainage of water from section 404 to primary water collection channel 401. It should be understood that dimensions D1 and D2 can be changed to optimize the water collection capacity of the primary water collection channel 401, as well as to ensure non-clogging, and allow for easy inspection and cleaning. Similarly, dimensions D3 and D4 can be changed to optimize the water collection capacity of the secondary water collection channel 402, as well as to ensure non-clogging, and allow for easy inspection and cleaning. The decision on how to define dimensions D5, D6, D7, and D8 is a balance between the acceptable airside pressure drop through the overlapping gutter water collection system 400, the difficulty in degree of manufacturing, and allowable cost and weight of the overlapping gutter water collection system 400.

Figure 5:
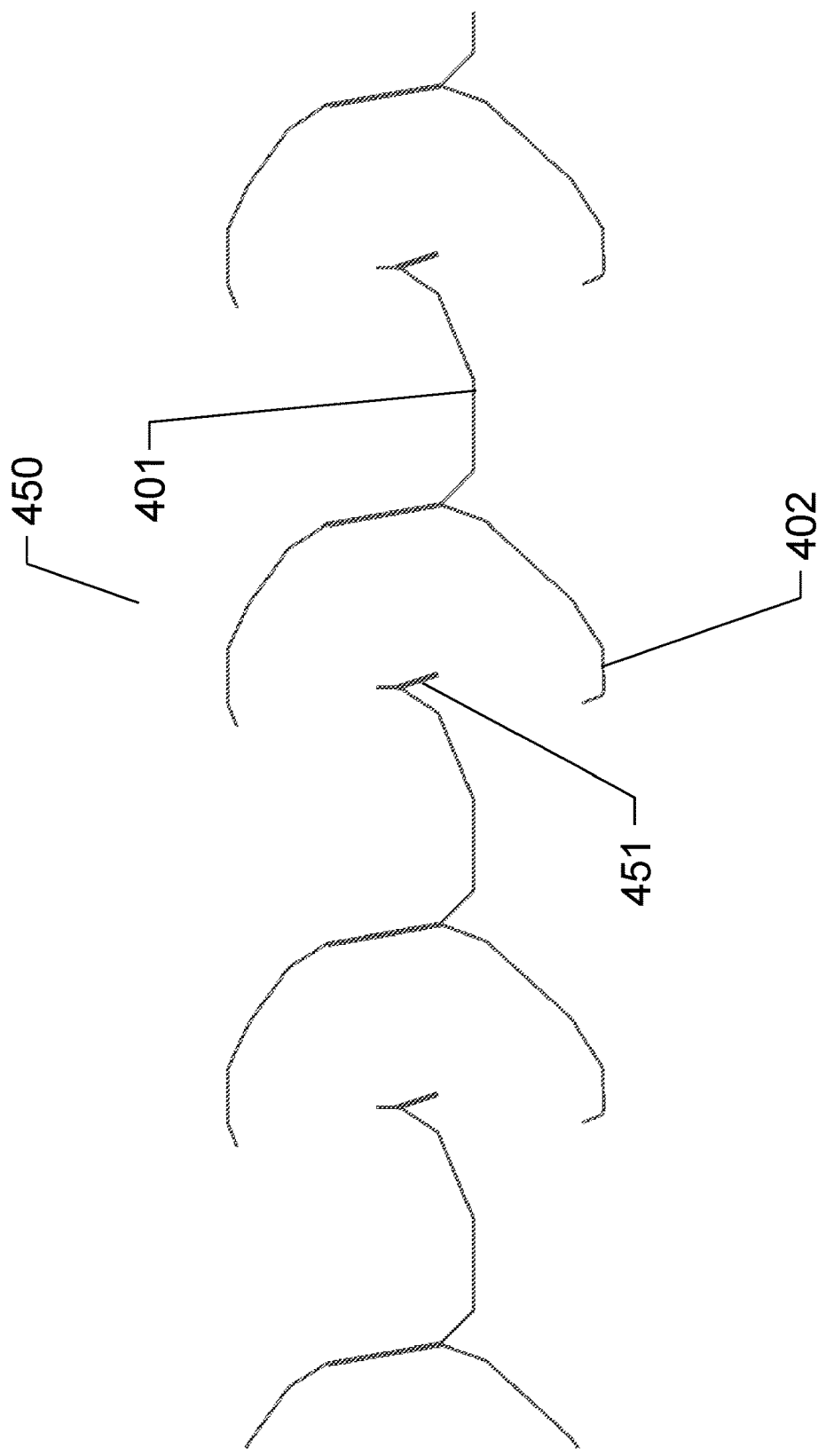
FIG. 5 is a front side view of a sub-section of an overlapping gutter water collection system in accordance with a thirteenth embodiment of the present invention.

Now referring to FIG. 5, a thirteenth embodiment is shown. In order to increase the water collection efficiency of the overlapping gutter water collection system 400 of the fifth embodiment shown in FIG. 2A, thirteenth embodiment 450 is shown in FIG. 5 with a drip edge 451 added to gutter assemblies of the overlapping gutter water collection system 400. The addition of the drip edge 451 helps counteract the effects of surface tension and force any water that would overflow from the primary water collection channel 401 to drain into the secondary water collection channel 402, under the effect of gravity. The length, angles, position and shape of the drip edge 451 are designed to balance the water collection performance and limit the airside pressure drop through the overlapping gutter water collection system 450, and is not a limitation of this embodiment.

Fourteenth and fifteenth embodiments are shown in FIGS. 6A and 6B, respectively. To further increase the water collection capacity of overlapping gutter water collection system 400 of the fifth embodiment FIG. 2A, a fourteenth embodiment 460 is shown in FIG. 6A, with slots 461 that allow water to flow freely from primary water collection channel 401 to secondary water collection channel 402, once water in primary water collection channel 401 reaches a given level. It should be understood that the location, number and dimensions of the slots 461 need to be optimized to limit risk of clogging, to control the water level in primary water collection channel 401, and to control water flow to secondary water collection channel 402. The secondary water collection channel 402 is shown in FIG. 6A with greater D3 and D4, as defined than in the overlapping gutter water collection system 400 of the fifth embodiment FIG. 2A, in order to increase the water collection capacity of the secondary water collection channel 402, and is not a limitation of this embodiment. As shown in FIG. 6B, the fifteenth embodiment 470 describes another way to further increase the water collection capacity of the overlapping gutter water collection system 400 of the fifth embodiment FIG. 2A, by adding slots 471 to the primary water collection channel 401, and drip edges 472 as in the thirteenth embodiment 450 as shown in FIG. 5. It should be understood that dimensions of the slots 471 need to be optimized to limit risk of clogging, to control the water level in primary water collection channel 401, and to control water flow to secondary water collection channel 402. The secondary water collection channel 402 is shown in FIG. 6B with greater D3 and D4 than in the overlapping gutter water collection system 400 of the fifth embodiment FIG. 2A, in order to increase the water collection capacity of the secondary water collection channel 402, and is not a limitation of this embodiment. The length, angles, position and shape of the drip edge 472 will be designed to balance the water collection performance and limit the airside pressure drop through the overlapping gutter water collection system 470, and is not a limitation of this embodiment.

Figure 7:
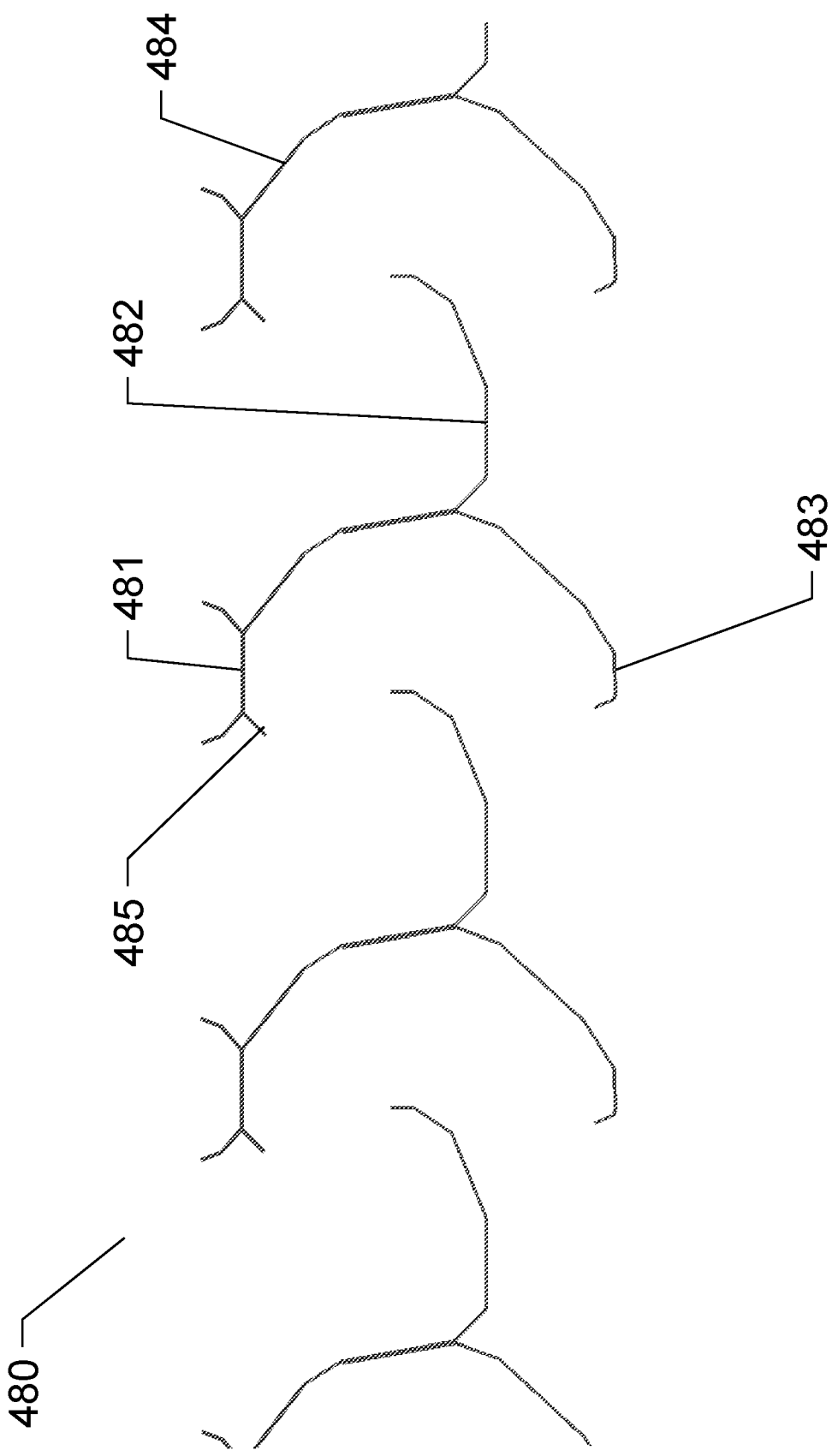
FIG. 7 is a front side view of a sub-section of an overlapping gutter water collection system in accordance with a sixteenth embodiment of the present invention.

Referring now to FIG. 7, overlapping gutter water collection system 480 is in accordance with the sixteenth embodiment of the present invention. FIG. 7 shows two complete and two partial sets of gutter assemblies. Overlapping gutter water collection system 480 has a primary water collection channel 482, a secondary water collection channel 483, and a tertiary water collection channel 481. Primary water collection channel 482 extends into a curved deflection plate 484, which is connect to tertiary water collection channel 481, to direct water flow toward primary water collection channel 482. A drip edge 485 counteracts the effects of surface tension and forces the water to drain into the primary water collection channel 482, under the effect of gravity. It should be understood that similarly to the overlapping gutter water collection system 400 of the fifth embodiment FIG. 2A, water collection channels height and width can be changed to optimize the water collection capacity and airflow resistance of overlapping gutter water collection system 480. The length, angles, position and shape of the drip edge 485 will be designed to balance the water collection performance and limit the airside pressure drop through the overlapping gutter water collection system 480, and is not a limitation of this embodiment.

A seventeenth embodiment is shown in FIG. 8A. Similar components have similar numerals as FIG. 1B. As shown in FIG. 8A, embodiment 500 is an evaporative indirect heat exchanger product which could be a closed circuit cooling tower or an evaporative condenser, with an overlapping water gutter system 501, in accordance with a seventeenth embodiment of the present invention. Gutter assemblies of overlapping water gutter system 501 of embodiment 500 could be similar to that of previous embodiments. Although FIG. 8A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Heat exchanger of the evaporative cooling equipment could direct or indirect, and is not a limitation of the embodiment. Additionally, motor 025 may be directly connected to the fan 026 as shown, be belt drive, or gear drive. Furthermore, it should be understood that indirect heat exchangers are not a limitation to embodiments presented. As shown in FIG. 8A, the overlapping water gutter system 501 extends almost through the entire unit, resulting in the entire volume 036 underneath it to be dry. The water collected by the gutter assemblies of the overlapping gutter water gutter system 501 is funneled to a water collection trough 502, from which it drains to the sump 021 under the effect of gravity, via a drain 503. The slope of the overlapping gutter water collection system 501 is typically greater than 0° and less than 80°, with optimal angle between 1° and 5°. It should be understood that the size and shape of the water collection trough 502, as well as the length and nature of the drain 503, and the width and depth of the sump 021, are not a limitation of the present embodiment.

Figure 8B:
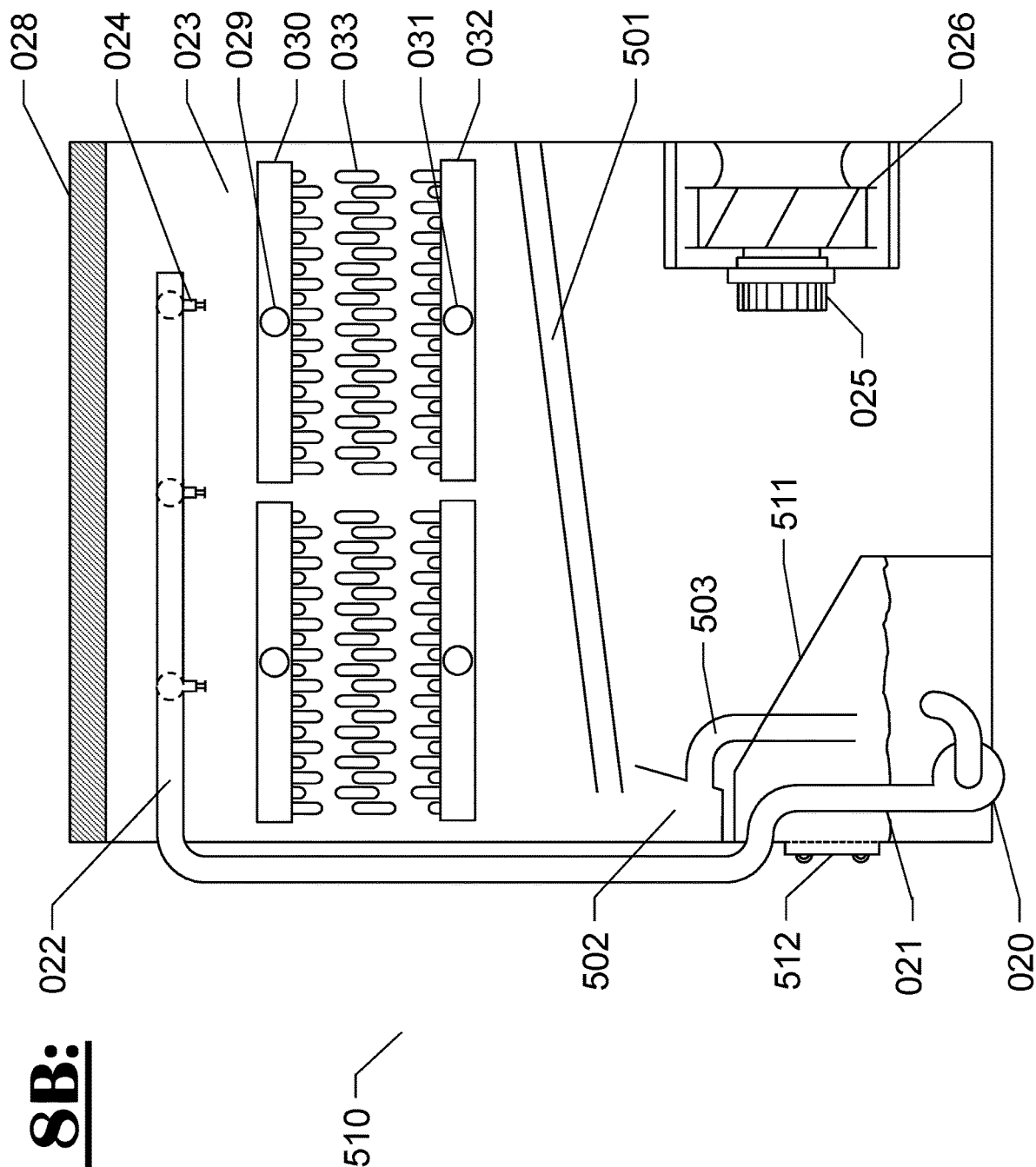

An eighteenth embodiment 510 of the present invention is shown in FIG. 8B. The eighteenth embodiment 510 describes an alternative arrangement to that of the seventeenth embodiment 500, in which the sump 021 can be inspected while the fan 026 and spray pump 020 are in operation. Gutter assemblies of overlapping water gutter system 501 of embodiment 510 could be similar to that of previous embodiments. A solid panel 511 is used to isolate the sump 021 and associated make-up and sump heater devices (not shown) from the air stream. Solid panel 511 is designed to accommodate the drain 503 connecting the water collection trough 502 to the sump 021. Accessibility to the sump 021 from the outside of the unit is made possible by the presence of an access door 512. Although FIG. 8B is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, be belt drive, or gear drive. Furthermore, it should be understood that indirect heat exchangers are not a limitation to the embodiment presented. The slope of the overlapping gutter water collection system 501 is typically greater than 0° and less than 80°, with optimal angle between 1° and 5°. It should be understood that the size and of the water collection trough 502, as well as the length and nature of the drain 503, the width and depth of the sump 021, the shape and size of the solid panel 511, and the shape, size and location of the access door 512 are not a limitation of the present embodiment. For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

Figure 8C:
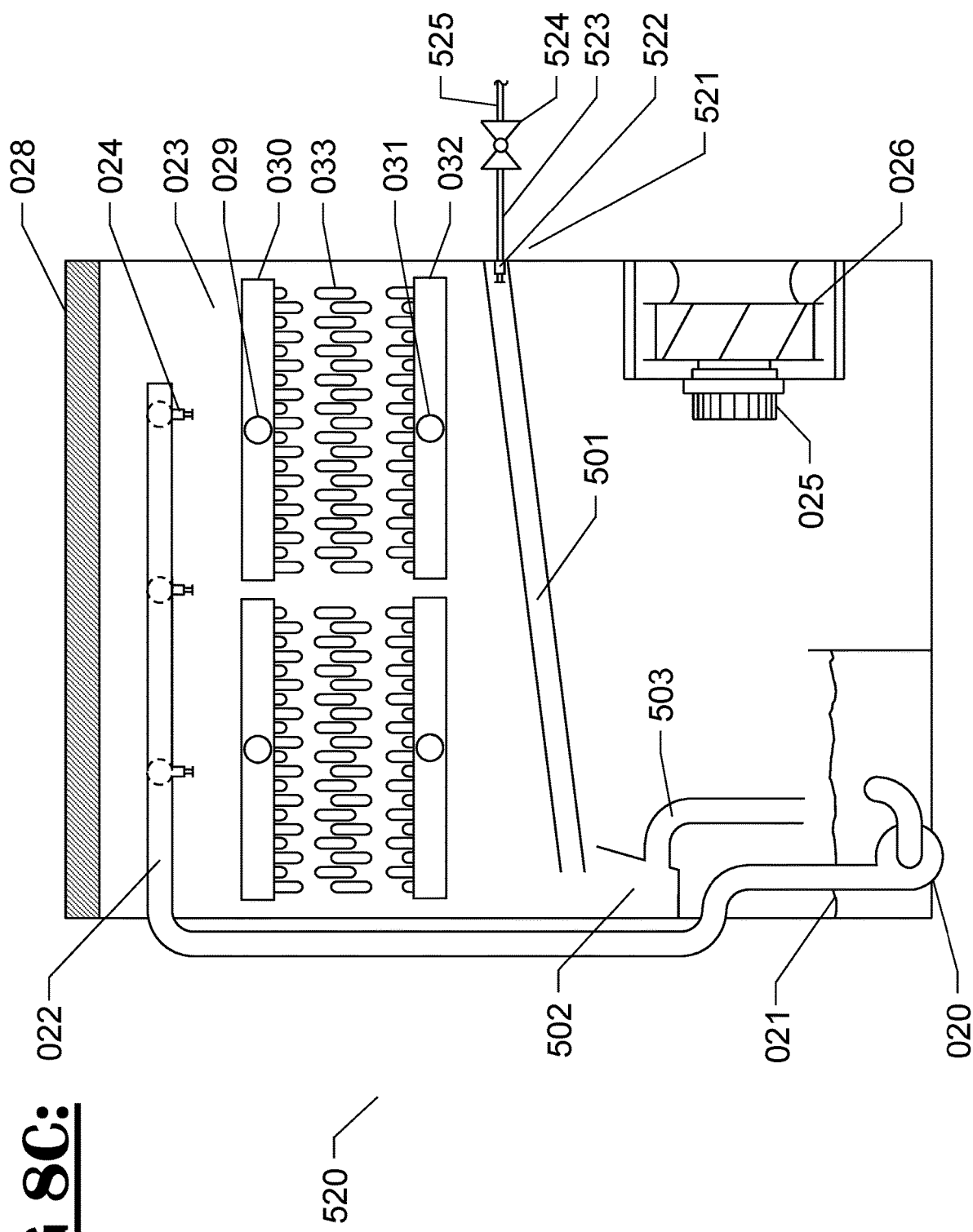

A nineteenth embodiment 520 of the present invention is shown in FIG. 8C. The nineteenth embodiment 520 describes an alternative arrangement to that of the seventeenth embodiment 500, in which overlapping water gutter system 501 is equipped with a cleaning system 521, to prevent clogging of the gutters. For each gutter assembly, the cleaning system is composed of a nozzle 522, a water supply line 523, a valve 524 to control water flow, and a connection to a water supply 525. Cleaning water could be clean water from the network, spray water from the sump, make-up water, or recycled water. The cleaning water source is not a limitation of the embodiment. Note that gutter cleaning system 521 can be added to all disclosed embodiments. Gutter assemblies of overlapping water gutter system 521 of embodiment 520 could be similar to that of previous embodiments. Although FIG. 8C is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Heat exchanger of the evaporative cooling equipment could direct or indirect, and is not a limitation of the embodiment. Additionally, motor 025 may be directly connected to the fan 026 as shown, be belt drive, or gear drive. Furthermore, it should be understood that indirect heat exchangers are not a limitation to embodiments presented. The slope of the overlapping gutter water collection system 501 is typically greater than 0° and less than 80°, with optimal angle between 1° and 5°. Finally, it should be understood that the size and of the water collection trough 502, as well as the length and nature of the drain 503, and the width and depth of the sump 021, are not a limitation of the present embodiment.

Figure 9A:
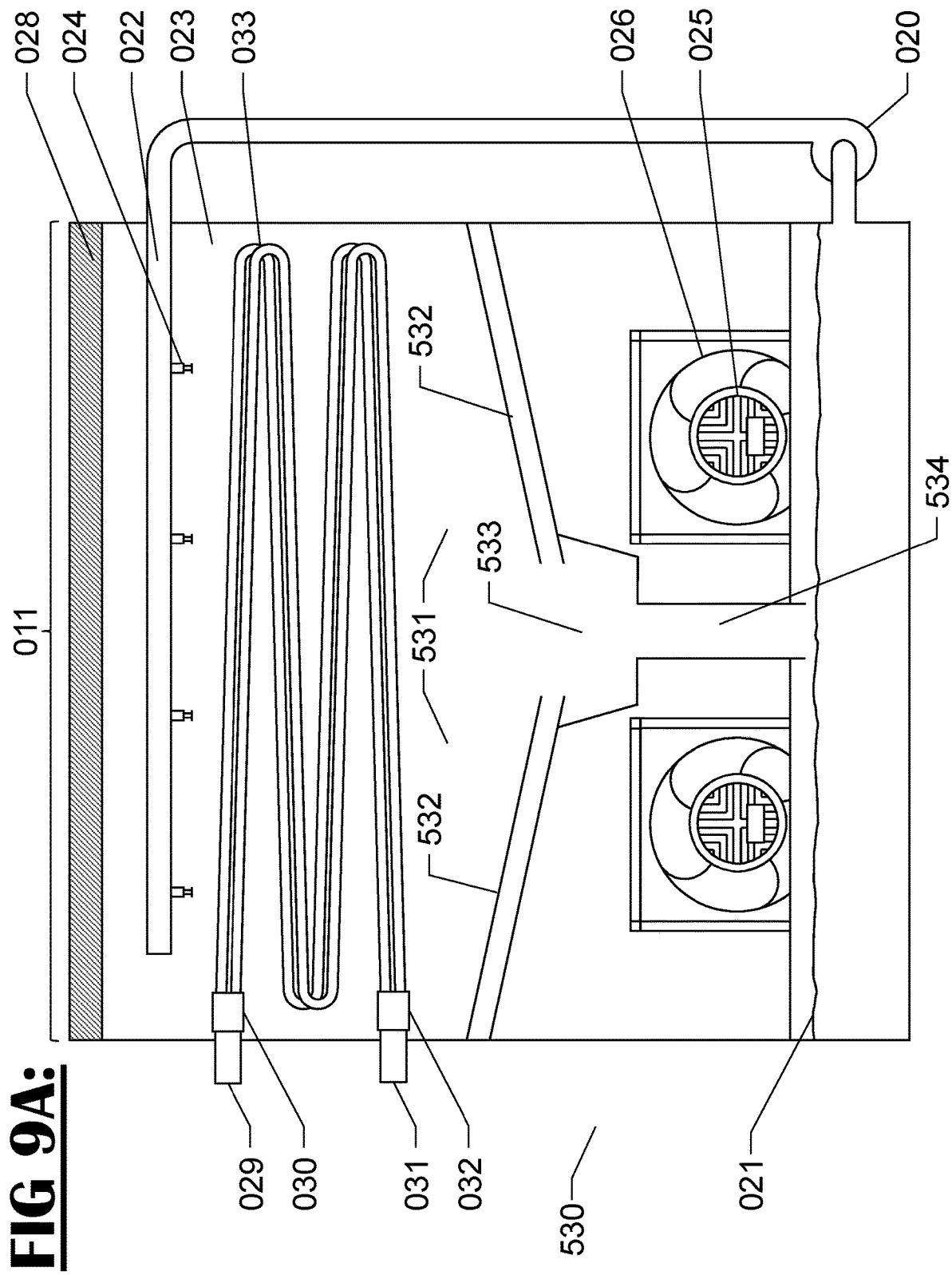

A twentieth embodiment is shown in FIG. 9A. Similar components have similar numerals as per FIG. 1B in FIGS. 9A and 9B. FIG. 9A shows a backside view, though the blank-off face 011 (as defined in FIG. 1) of embodiment 530, which is an evaporative indirect heat exchanger product which could be a closed circuit cooling tower or an evaporative condenser, with an overlapping water gutter system 531, in accordance with a twentieth embodiment of the present invention. Gutter assemblies of overlapping water gutter system 531 of embodiment 530 could be similar to that of previous embodiments. Although FIG. 9A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, be belt drive, or gear drive. It should be understood that the process fluid direction may be reversed to optimize heat transfer and is not a limitation to the embodiment presented. It also should be understood that the number of circuits and the number of passes or rows of tube runs within a serpentine indirect heat exchanger is not a limitation to embodiments presented. Furthermore, it should be understood that indirect heat exchangers are not a limitation to embodiments presented. The overlapping gutter assemblies 532 of the water collection system 531 of embodiment 530 are sloped towards the center of the unit, a slope typically greater than 0° and less than 80°, with optimal angle between 1° and 5°, so as to direct the water towards a central water collection trough 533, from which the water circulates to the sump 021, via a drain 534. Water collection system 532 only extend through part of the unit, creating wet and dry regions as defined in FIG. 1. It should be understood that the angle and length of the overlapping water gutter system 531, the size and of the water collection trough 533, as well as the length and nature of the drain 534, and the width and depth of the sump 021, are not a limitation of the present embodiment. For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

A twenty-first embodiment 540 of the present invention is shown in FIG. 9B. The twenty-first embodiment 540 describes another way to optimize airflow and water management, with an overlapping water gutter system 541. Gutter assemblies of overlapping water gutter system 541 of embodiment 540 could be similar to that of previous embodiments. Compared to that of embodiment 530 shown in FIG. 9A, the overlapping gutter assemblies 542 of the water collection system 541 of embodiment 540 are sloped towards the sides of the unit, a slope typically greater than 0° and less than 80°, with optimal angle between 1° and 5° so as to direct the water towards lateral central water collection troughs 543, from which the water circulates to the sump 021, via a drain 544. As in the fifth embodiment of the present invention, as shown in FIG. 2, the overlapping water gutter system 541 of the twenty-first embodiment only extend through part of the unit, creating a wet region 037 and a dry region 036, as defined in FIG. 1. It should be understood that the angle and length of the overlapping gutter water gutter system 541, the size and of the water collection trough 543, as well as the length and nature of the drain 544, and the width and depth of the sump 021, are not a limitation of the present embodiment.

Figure 10A:
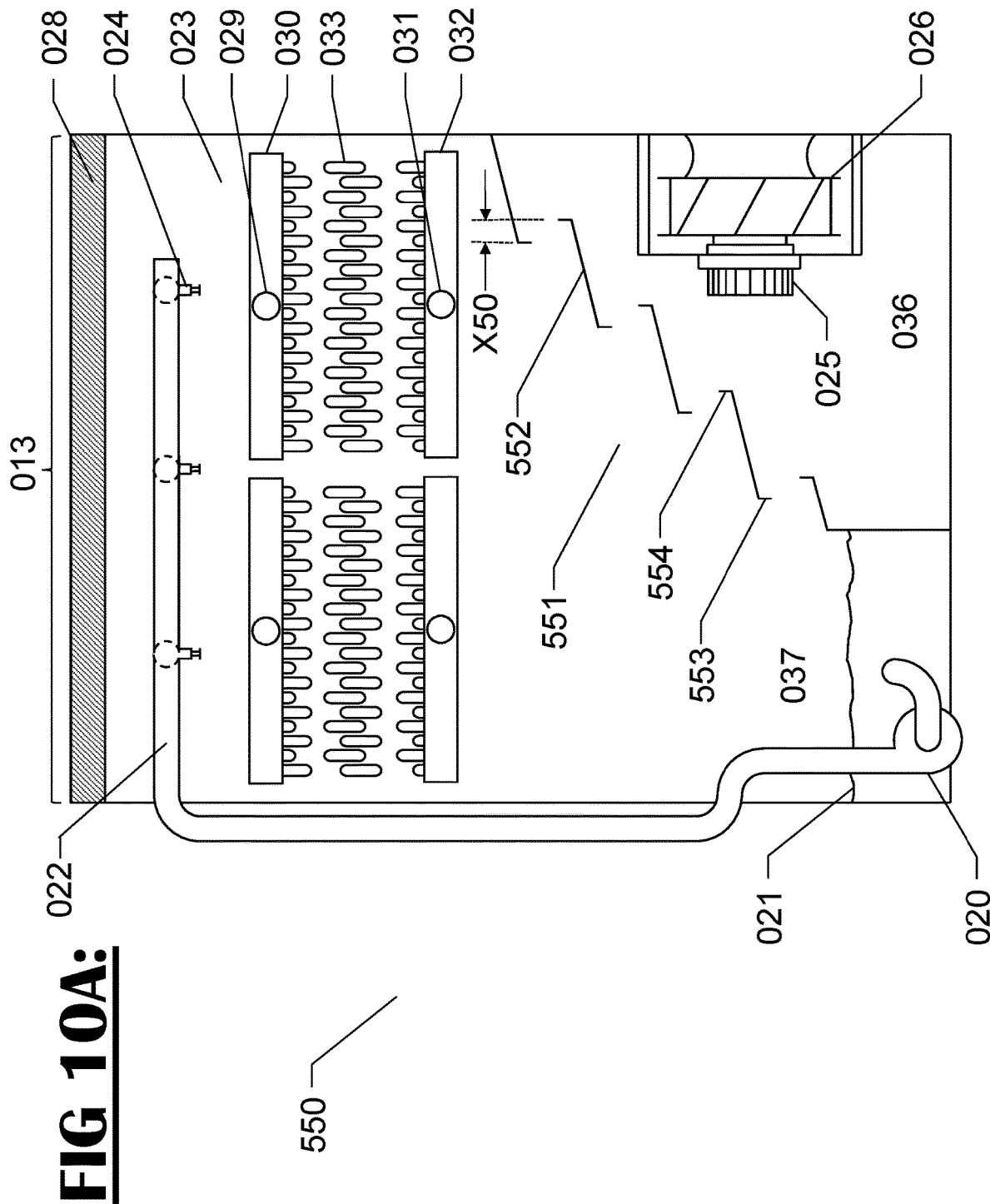
FIGS. 10A and 10B are side views of an evaporative indirect heat exchanger product in accordance with a twenty-second and twenty-third embodiment of the present invention.

Referring now to FIG. 10A, a twenty-second embodiment is shown. Similar components have similar numerals as FIG. 1B in FIGS. 10A and 10B. As shown in FIG. 10A, embodiment 550 is an evaporative indirect heat exchanger product which could be a closed circuit cooling tower or an evaporative condenser, with an overlapping sloped panel water management system 551, in accordance with a twenty-second embodiment of the present invention. Although FIG. 10A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, be belt drive, or gear drive. It should be understood that the process fluid direction may be reversed to optimize heat transfer and is not a limitation to the embodiment presented. It also should be understood that the number of circuits and the number of passes or rows of tube runs within a serpentine indirect heat exchanger is not a limitation to embodiments presented. Furthermore, it should be understood that indirect heat exchangers are not a limitation to embodiments presented. Each sloped panel of the sloped panel water management system 551 is composed of a generally straight but sloped section 552, a generally downward pointing drip edge 553, and a generally upward pointing deflection plate 554 to prevent overflow and limit splash out. Panels of the overlapping sloped panel water management system 551 of the twenty-second embodiment overlap, such that dimension X50 is greater than 0 inch. It should be understood that the angle and length of the overlapping sloped panels, the vertical spacing between panels and the length of the overlap between panels 552, as well as the length and angle of the drip edge 553 and deflection plate 554, are designed to balance the water collection performance and limit the airside pressure drop through the overlapping sloped panel water management system 551, and is not a limitation of this embodiment. Additionally, sloped panel water management system 551 design can be adjusted to optimize the ratio between dry region 036 and wet region 037. For most embodiments presented, evaporative cooling equipment is in forced draft, single-sided air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

Figure 10B:
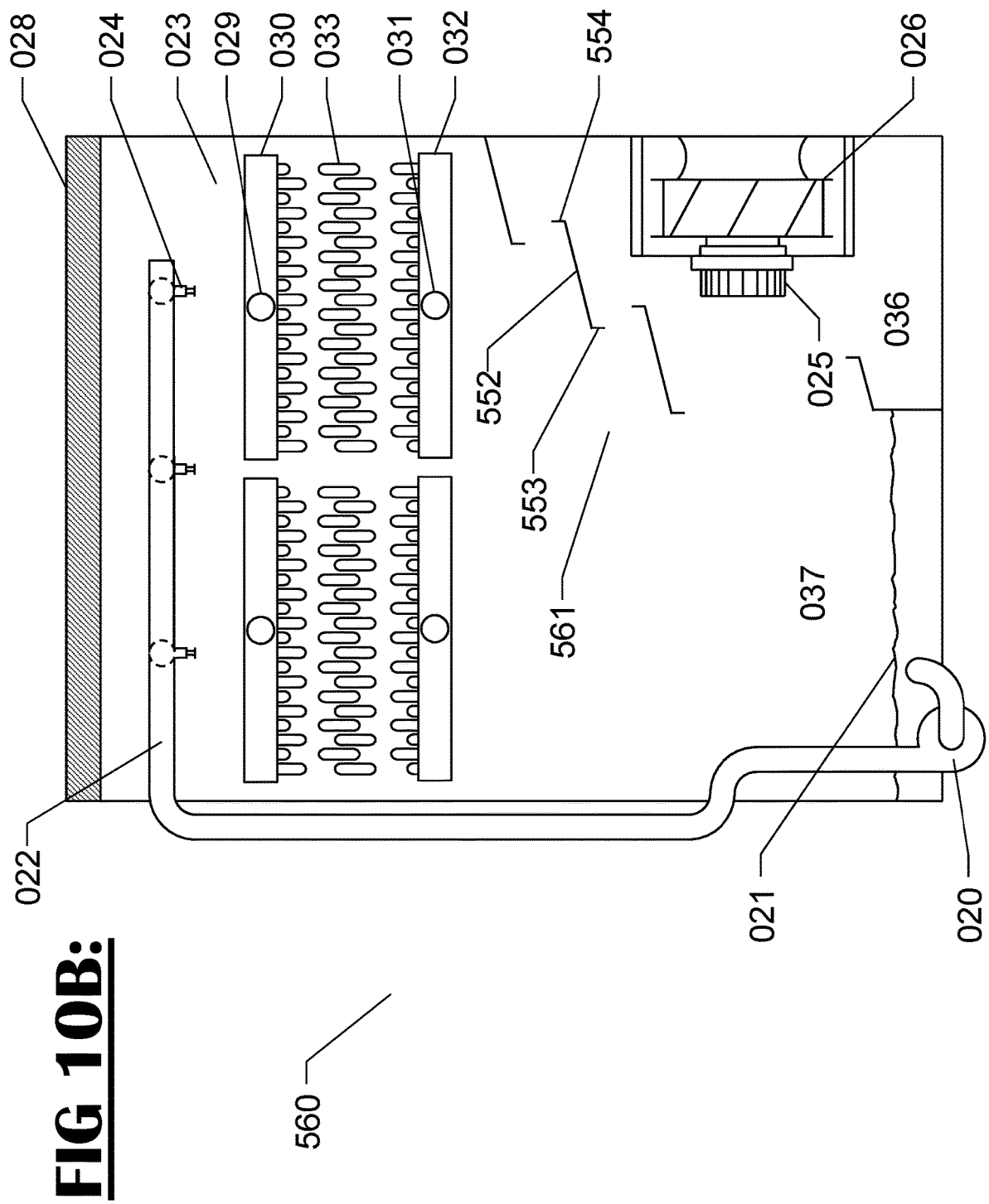

A twenty-third embodiment 560 of the present invention is shown in FIG. 10B. The twenty-third embodiment 560 describes another way to optimize airflow and water management, using an overlapping sloped panel water management system 561. Each sloped panel of the overlapping sloped panel water management system 561 of the twenty-third embodiment is composed of a generally straight but sloped section 552, a generally downward pointing drip edge 553, and a generally upward pointing deflection plate 554. This embodiment allows for a more compact design, fewer parts, and greater optimization potential. Additionally, it should be understood that the angle and length of the overlapping sloped panels, the vertical spacing between panels and the length of the overlap between panels, as well as the length and angle of the drip edge 553 and deflection plate 554, are designed to balance the water collection performance and limit the airside pressure drop through the overlapping sloped panel water management system 561. Additionally, sloped panel water management system 561 design can be adjusted to optimize the ratio between dry region 037 and wet region 036. Although embodiments are shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Heat exchanger of the evaporative cooling equipment could direct or indirect, and is not a limitation of the embodiment.

Figure 11A:
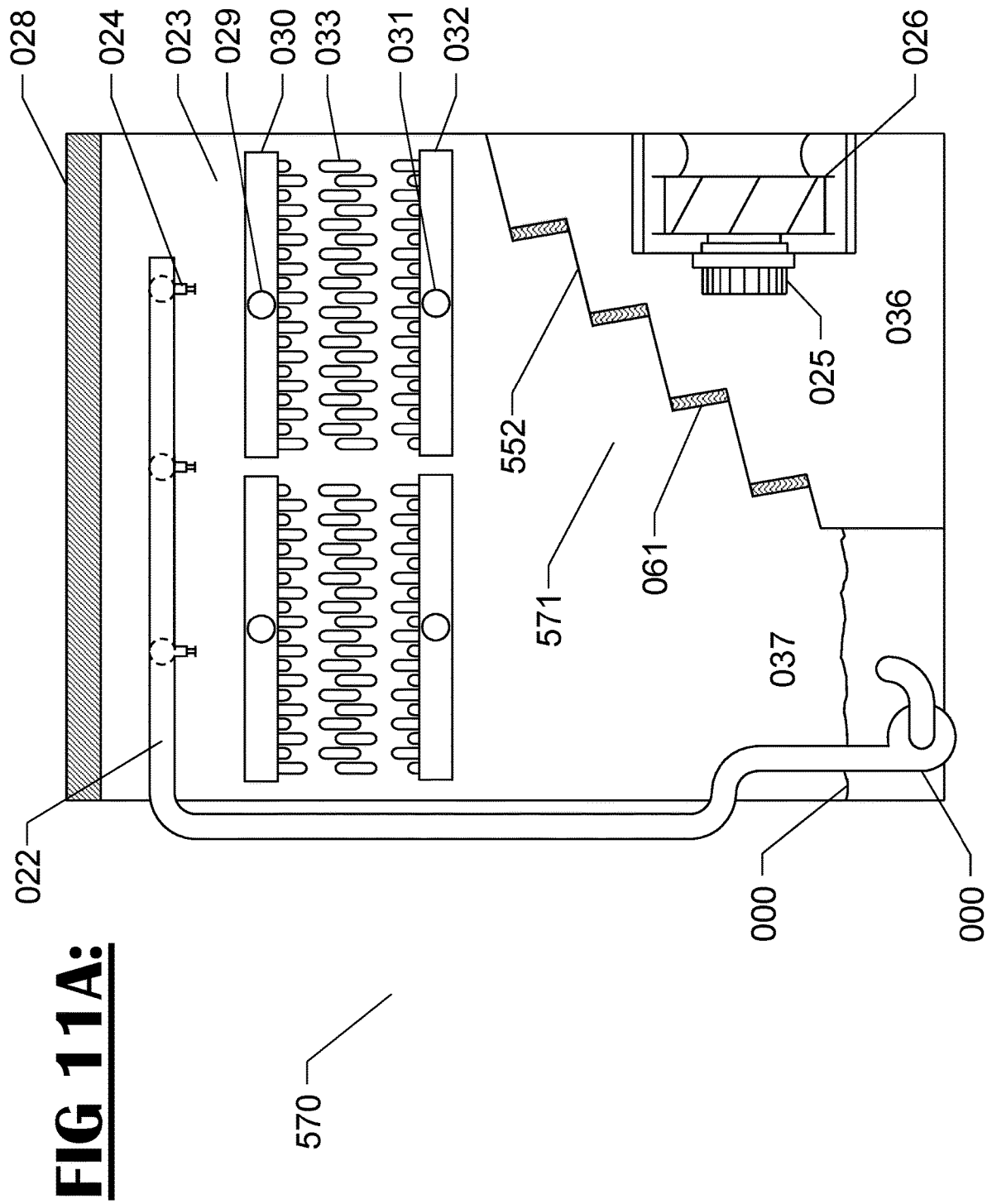
FIGS. 11A and 11B are side views of an evaporative indirect heat exchanger product in accordance with a twenty-fourth and twenty-fifth embodiment of the present invention.

Now referring to FIG. 11A, a twenty-fourth embodiment is shown. Similar components use similar numerals as FIG. 1B in FIGS. 11A and 11B. To further increase water management efficiency of the twenty-second embodiment shown in FIG. 10A, twenty-fourth embodiment 570 is shown in FIG. 11A with louvers 061 separating the sloped panels 552 of the overlapping sloped panel water management system 571. The use of louvers 061 in the openings between sloped panels assures that virtually no water will reach the dry area 036 surrounding the motor 025 and fan 026, and negates the use need for drip edge 553 and deflection plate 554 as for the twenty-second embodiment shown in FIG. 10A. It should be understood that the angle and length of the overlapping sloped panels, the vertical spacing between panels and the length of the overlap between panels, are designed to balance the water collection performance and limit the airside pressure drop through the overlapping sloped panel water management system 571, and is not a limitation of this embodiment. Additionally, sloped panel water management system 571 design can be adjusted in width to optimize the ratio between dry region 036 and wet region 037. Although FIG. 11A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. It should be understood that fan location and the direction of the air intake and discharge could be optimized, and are not a limitation to the embodiment presented. Heat exchanger of the evaporative cooling equipment could direct or indirect, and is not a limitation of the embodiment. For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

Figure 11B:
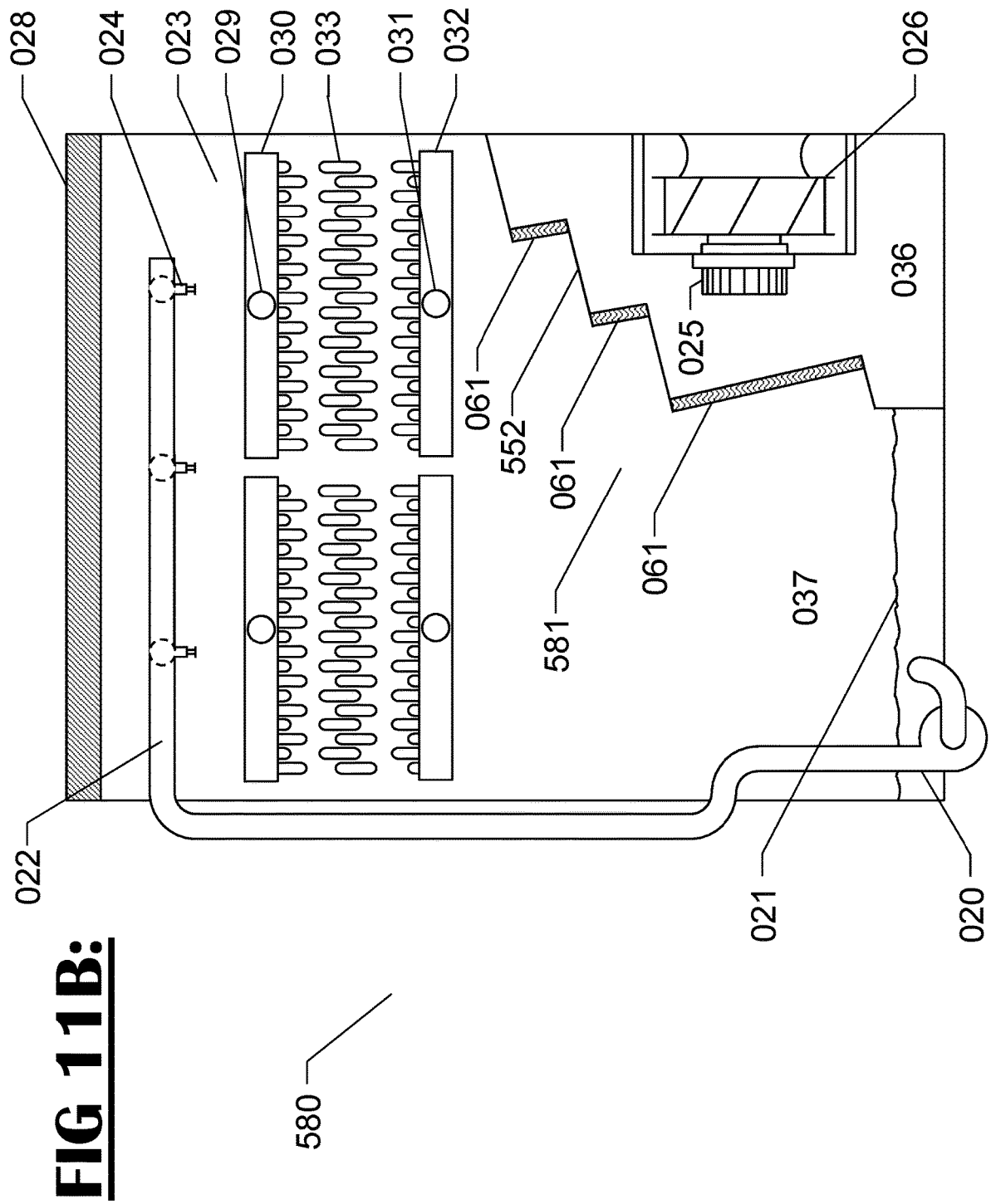

To further increase water management efficiency of the twenty-third embodiment shown in FIG. 10B, twenty-fifth embodiment 580 is shown in FIG. 11B with louvers 061 separating the sloped panels 552 of the overlapping sloped panel water management system 581. The use of louvers 061 in the openings between sloped panels virtually guarantees that no water will reach the dry area surrounding the motor 025 and fan 026, and negates the use of drip edge 553 and deflection plate 554 as for the twenty-third embodiment shown in FIG. 10B. Sloped panels 552 of the overlapping sloped panel water management system 581 of the twenty-fifth embodiment are not evenly spaced. It should be understood that the angle and length of the overlapping sloped panels, the vertical spacing between panels and the length of the overlap between panels, are designed to balance the water collection performance and limit the airside pressure drop through the overlapping sloped panel water management system 581. Additionally, sloped panel water management system 581 design can be adjusted to optimize the ratio between dry region 036 and wet region 037. Although FIG. 11B is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. It should be understood that fan location and the direction of the air intake and discharge could be optimized, and are not a limitation to the embodiment presented. Heat exchanger of the evaporative cooling equipment could direct or indirect, and is not a limitation of the embodiment.

Figure 12B:
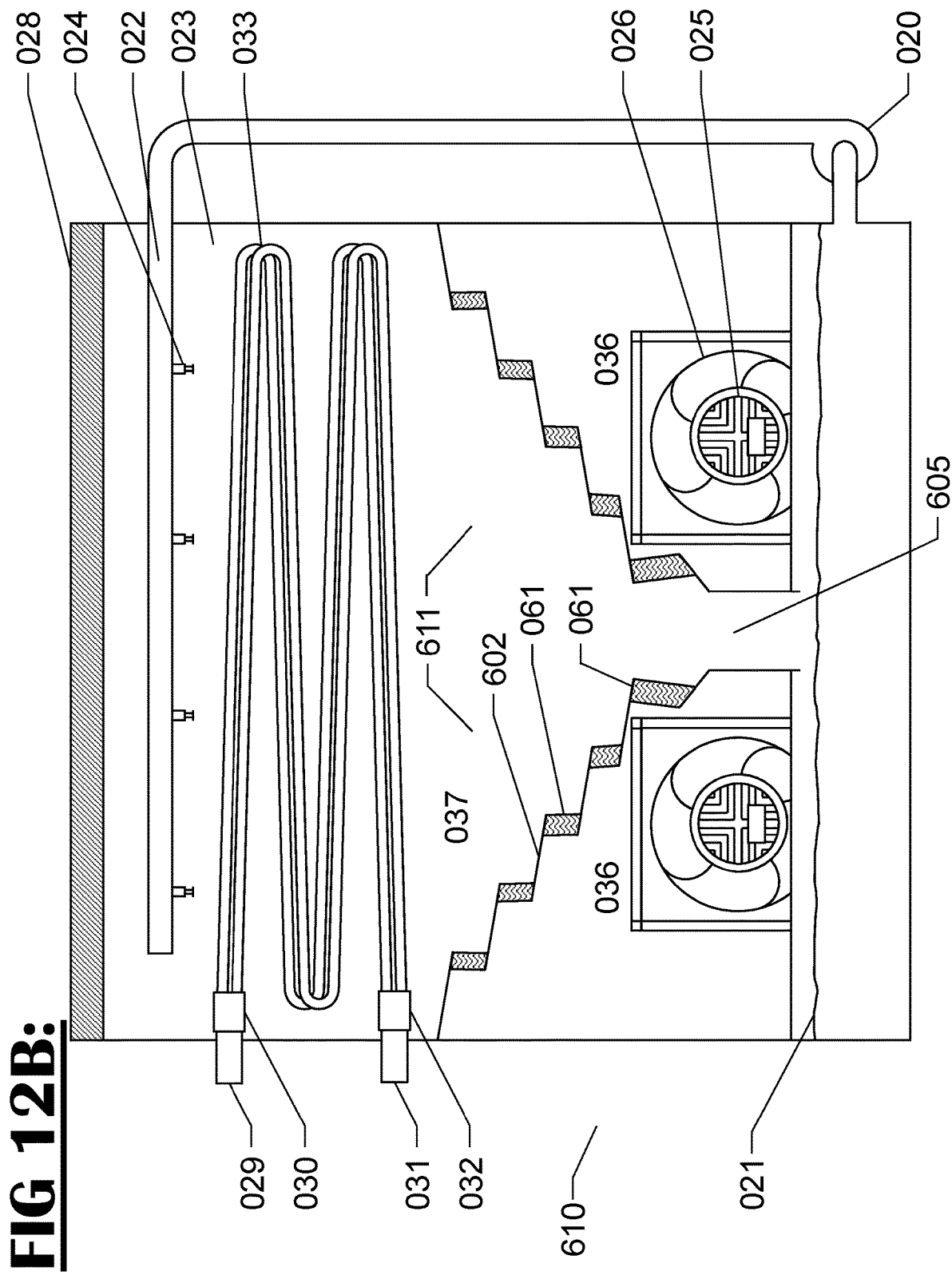

Referring now to FIG. 12A, a twenty-sixth embodiment is shown. Similar components use similar numerals as FIG. 1B in FIGS. 12A and 12B. FIG. 12A shows a backside view, through the blank-off face (as defined in FIG. 1) of embodiment 600, which is an evaporative indirect heat exchanger product which could be a closed circuit cooling tower or an evaporative condenser, with an overlapping sloped panel water management system 601, in accordance with a twenty-sixth embodiment of the present invention. Although FIG. 12A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. Additionally, motor 025 may be directly connected to the fan 026 as shown, be belt drive, or gear drive. It should be understood that the process fluid direction may be reversed to optimize heat transfer and is not a limitation to the embodiment presented. It also should be understood that the number of circuits and the number of passes or rows of tube runs within a serpentine indirect heat exchanger is not a limitation to embodiments presented. Furthermore, it should be understood that indirect heat exchangers are not a limitation to embodiments presented. Each sloped panel is composed of a generally straight but sloped section 602, a generally downward pointing drip edge 603, and a generally upward pointing deflection plate 604 to prevent overflow and limit splash out. The panels of the water management system 601 are sloped towards the center of the unit, so as to direct the water towards a central water collection trough 605, from which the water cascades to the sump 021. As in the twenty-second embodiment of the present invention, as shown in FIG. 10A, the overlapping sloped panel water management system 601 of the twenty-sixth embodiment only extends through part of the unit, creating a wet region 037 and a dry region 036. It should be understood that the angle and length of the overlapping sloped panels, the vertical spacing between panels and the length of the overlap between panels, as well as the length and angle of the drip edge 603 and deflection plate 604, are designed to balance the water collection performance and limit the airside pressure drop through the overlapping sloped panel water management system 601. Additionally, sloped panel water management system 601 design can be adjusted to optimize the ratio between wet and dry regions 037 and 036, respectively. Although FIG. 12A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. It should be understood that fan location and the direction of the air intake and discharge could be optimized, and are not a limitation to the embodiment presented. Heat exchanger of the evaporative cooling equipment could direct or indirect, and is not a limitation of the embodiment. For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

A twenty-seventh embodiment 610 of the present invention is shown in FIG. 12B. The twenty-seventh embodiment 610 describes another way to optimize airflow and water management, using an overlapping sloped panel water management system 611. However, the overlapping sloped panel water management system 611 of the twenty-seventh embodiment are separated by louvers 061. The use of louvers 061 in the openings between sloped panels virtually guarantees that no water will reach the dry area surrounding the motor 025 and fan 026, and negates the need for drip edge 603 and deflection plate 604, as used in the twenty-sixth embodiment shown in FIG. 12A. It should be understood that the angle and length of the overlapping sloped panels, the vertical spacing between panels and the length of the overlap between panels, are designed to balance the water collection performance and limit the airside pressure drop through the overlapping sloped panel water management system 611. Additionally, sloped panel water management system 611 design can be adjusted to optimize the ratio between dry and wet regions 037 and 036, respectively. Although FIG. 12B is shown with unhoused centrifugal fan 026 forcing or pushing air through the unit, the actual fan system may be any style fan system that moves air through the unit including but not limited to forced draft in a generally counterflow, crossflow or parallel flow with respect to the spray. Finally, it should be understood that fan location and the direction of the air intake and discharge could be optimized, and are not a limitation to the embodiment presented. Heat exchanger of the evaporative cooling equipment could direct or indirect, and is not a limitation of the embodiment.

Figure 13A:
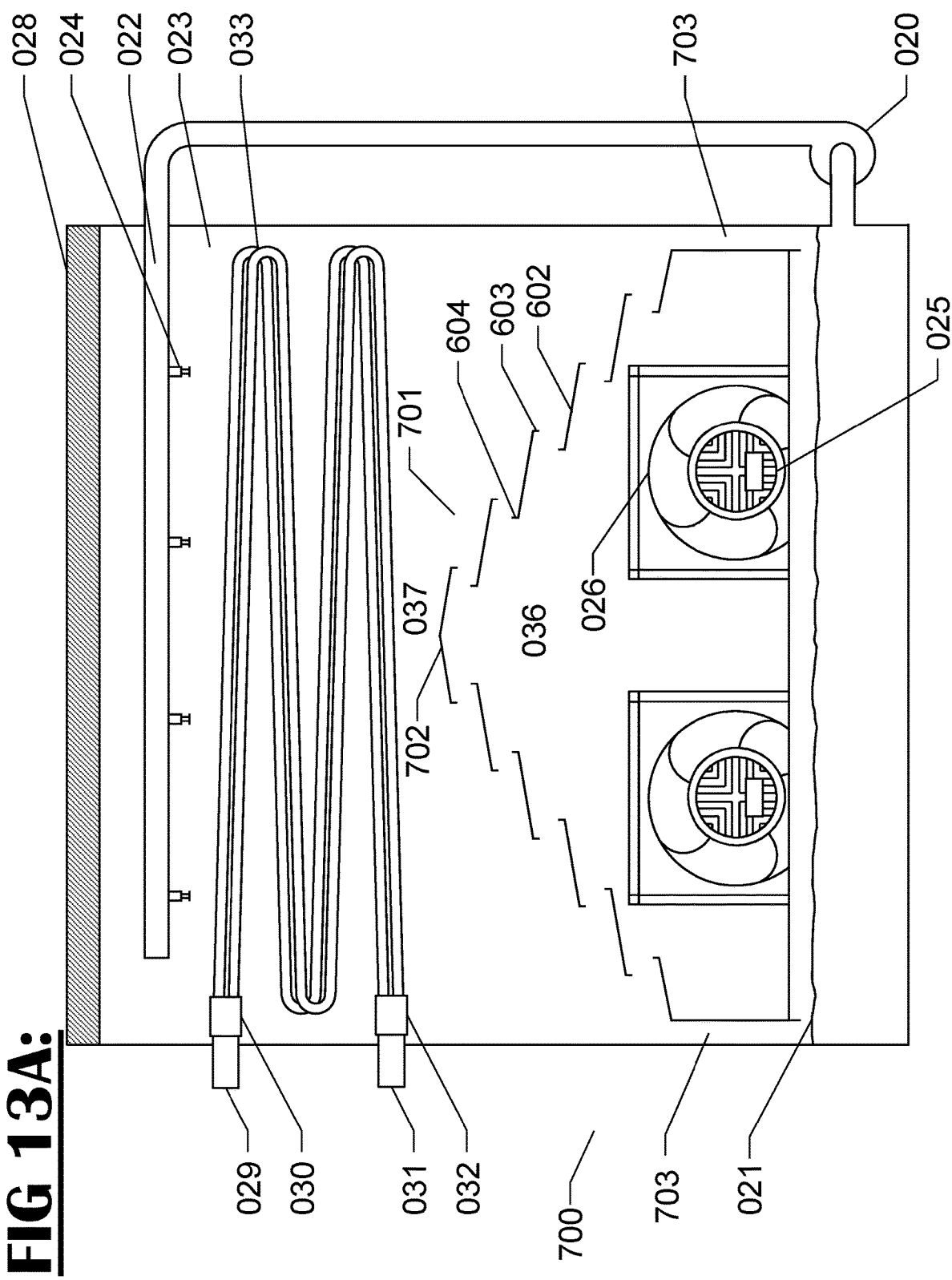
FIGS. 13A and 13B are back side views of an evaporative indirect heat exchanger product in accordance with a twenty-eighth and twenty-ninth embodiment of the present invention.

Referring now to FIG. 13A, a twenty-eight embodiment is shown. Similar components use similar numerals as FIG. 1B in FIGS. 13A and 13B. As shown in FIG. 13A, embodiment 700 is an evaporative indirect heat exchanger product which could be a closed circuit cooling tower or an evaporative condenser, with an overlapping sloped panel water management system 701, in accordance with a twenty-eight embodiment of the present invention. Each sloped panel is composed of a generally straight but sloped section 602, a generally downward pointing drip edge 603, and a generally upward pointing deflection plate 604 to prevent overflow and limit splash out. The panels of the water management system 701 are sloped towards the sides of the unit, so as to direct the water towards lateral water collection troughs 703, from which the water cascades to the sump 021. An angled deflection plate 702 forms the top part of the overlapping sloped panel water management system 701. The overlapping sloped panel water management system 701 of the twenty-eight creates a wet region 037 and a dry region 036. It should be understood that the angle and length of the overlapping sloped panels 602, the vertical spacing between panels and the length of the overlap between panels, as well as the length and angle of the drip edge 603 and deflection plate 604, are designed to balance the water collection performance and limit the airside pressure drop through the overlapping sloped panel water management system 701, and is not a limitation of this embodiment. Additionally, sloped panel water management system 701 design can be adjusted to optimize the ratio between wet and dry regions 037 and 036, respectively. Although FIG. 13A is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. It should be understood that fan location and the direction of the air intake and discharge could be optimized, and are not a limitation to the embodiment presented. Heat exchanger of the evaporative cooling equipment could direct or indirect, and is not a limitation of the embodiment. For most embodiments presented, evaporative cooling equipment is in forced draft, single-singled air inlet configuration, but it is not a limitation of the invention, and of the embodiments presented. The invention also concerns double-sided air inlet, triple-sided air inlet, and quadruple-sided air inlet forced draft evaporative cooling equipment, as well as single-sided air inlet, double-sided air inlet, triple-sided air inlet, and quadruple-sided air inlet induced draft evaporative cooling equipment.

Figure 13B:
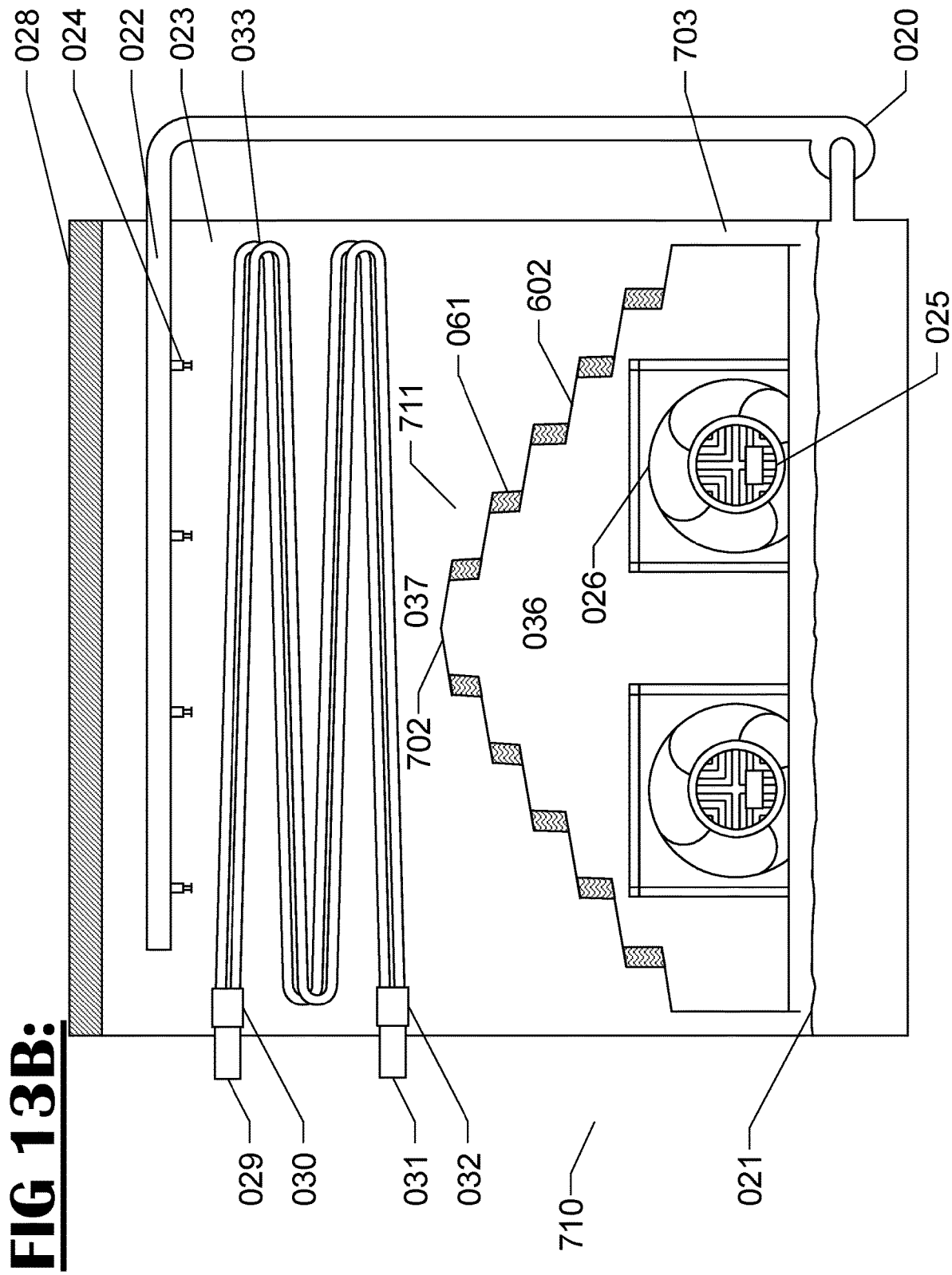

A twenty-ninth embodiment 710 of the present invention is shown in FIG. 13B. The twenty-ninth embodiment 710 presents another way to optimize airflow and water management, using an overlapping sloped panel water management system 711. However, contrary to the overlapping sloped panel water management system 701 of the twenty-eighth embodiment the overlapping sloped panel water management system 711 of the twenty-ninth embodiment are separated by louvers 061. The use of louvers 061 in the openings between sloped panels virtually guarantees that no water will reach the dry area surrounding the motor 025 and fan 026, and negates the need for drip edge 603 and deflection plate 604, as used in the twenty-eight embodiment shown in FIG. 13A. It should be understood that the angle and length of the overlapping sloped panels 602, the vertical spacing between panels and the length of the overlap between panels, are designed to balance the water collection performance and limit the airside pressure drop through the overlapping sloped panel water management system 711, and is not a limitation of this embodiment. Additionally, sloped panel water management system 711 design can be adjusted to optimize the ratio between dry region 037 and wet region 036. Although FIG. 13B is shown with unhoused centrifugal fan 026 forcing or pushing air through the unit, the actual fan system may be any style fan system that moves air through the unit including but not limited to forced draft in a generally counterflow, crossflow or parallel flow with respect to the spray. It should be understood that fan location and the direction of the air intake and discharge could be optimized, and are not a limitation to the embodiment presented. It should be understood that fan location and the direction of the air intake and discharge could be optimized, and are not a limitation to the embodiment presented. Heat exchanger of the evaporative cooling equipment could direct or indirect, and is not a limitation of the embodiment.

What is claimed:
1. A cooling tower comprising:
an outer structure,
an evaporative heat exchanger within the outer structure,
a fan assembly operable to generate airflow within the outer structure,
a gutter assembly located below the evaporative heat exchanger and within the outer structure,
an evaporative liquid distribution assembly located above the evaporative heat exchanger and within the outer structure, and
a sump,
wherein the gutter assembly collects at least a portion of the evaporative liquid falling from the evaporative heat exchanger and directs the collected evaporative liquid to the sump,
wherein the gutter assembly is comprised of a plurality of adjacent channel structures with a top and bottom frame,
each channel structure is comprised of a primary collection channel and a secondary collection channel,
each primary collection channel having a first end and each secondary collection channel having a first end,
wherein the first end of at least one of the primary collection channels of one channel structure extends above and laterally overlapping with the first end of a secondary collection channel of an adjacent channel structure.
2. The cooling tower of claim 1 wherein
the gutter assembly is configured to collect between 30-90% of the evaporative liquid falling from the evaporative heat exchanger.

3. The cooling tower of claim 1 wherein
the gutter assembly is configured to collect substantially all the evaporative liquid falling from the evaporative heat exchanger.
4. The cooling tower of claim 1 wherein
the evaporative heat exchanger is an indirect evaporative heat exchanger.
5. The cooling tower of claim 1 wherein
the evaporative heat exchanger is a direct evaporative heat exchanger.
6. The cooling tower of claim 1 wherein
the fan assembly is located below the gutter assembly.
7. The cooling tower of claim 6 further comprising
a louver structure extending from the gutter assembly to isolate the fan assembly from the evaporative liquid.
8. The cooling tower of claim 7 wherein
the louver structure extends at an angle of greater than 90 degrees from the vertical.
9. The cooling tower of claim 6 wherein
the fan assembly is kept essentially free from any incursion of evaporative liquid.
10. The cooling tower of claim 1 wherein
the fan assembly is located above the evaporative heat exchanger.
11. The cooling tower of claim 1 further comprising
a collection trough that collects the evaporative liquid exiting the gutter assembly and deposits the collected evaporative liquid into the sump.
12. The cooling tower of claim 11 further comprising
a trough louver structure extending from the gutter assembly adjacent to the collection trough to isolate the fan assembly from the evaporative liquid.
13. The cooling tower of claim 12 wherein
the trough louver structure extends at an angle of greater than 90 degrees from the vertical.
14. The cooling tower of claim 1 wherein
the gutter assembly is sloped towards the sump wherein such slope is greater than 1 degree from the horizontal.
15. The cooling tower of claim 1 wherein
a pressurized water system is connected to the gutter assembly.
16. The cooling tower of claim 1 wherein the gutter assembly includes
two gutter assemblies which slope downwardly towards each other and towards an evaporative liquid trough wherein the trough collects the evaporative liquid and directs the evaporative liquid into the sump.
17. The cooling tower of claim 1 wherein the gutter assembly includes
two gutter assemblies which slope downwardly away from each other and each gutter assembly is sloped towards an evaporative liquid trough wherein the troughs collect the evaporative liquid and directs the evaporative liquid into the sump.
18. The cooling tower of claim 1 wherein
the sump is isolated from the air and water within the outside structure.
19. The cooling tower of claim 1 wherein
at least one first end of a primary collection channel comprises a louver channel with a drip edge.
20. The cooling tower of claim 1 wherein
each channel structure is comprised of an assembled primary piece and a secondary piece.
21. The cooling tower of claim 1 wherein
a slot is provided in at least one of the channel structures between the primary collection channel and secondary collection channel.
22. The cooling tower of claim 1 wherein
each channel structure includes a tertiary collection channel,
each tertiary channel having a first end, and
wherein the tertiary collection channel extends above the primary and secondary channels.
23. A cooling tower comprising:
an outer structure,
an evaporative heat exchanger in the outer structure,
a fan assembly,
a gutter assembly below the evaporative heat exchanger and in the outer structure,
an evaporative liquid distribution assembly in the outer structure, the evaporative liquid distribution assembly configured to distribute evaporative liquid onto the evaporative heat exchanger,
a sump,
wherein the gutter assembly collects at least a portion of the evaporative liquid from the evaporative heat exchanger and directs the collected evaporative liquid toward the sump,
a pump operable to pump evaporative liquid from the sump to the evaporative liquid distribution assembly,
wherein the gutter assembly includes a plurality of elongate channel members extending longitudinally in the outer structure,
wherein each channel member includes a primary collection channel and a secondary collection channel on opposite sides of the channel member,
wherein each channel member includes a deflection plate extending above and laterally overlapping the secondary collection channel of the channel member, the deflection plate including a surface portion configured to direct evaporative liquid toward the primary collection channel of the channel member;
wherein the primary collection channel of at least one of the channel members extends between and laterally overlaps the deflection plate and the secondary collection channel of an adjacent one of the channel members so that the surface portion of the deflection plate of the at least one channel member directs evaporative fluid into the primary collection channel of the at least one channel member and evaporative liquid that overflows from the primary collection channel of the at least one channel member is received in the secondary collection channel of the adjacent channel member.
24. The cooling tower of claim 23 wherein
the gutter assembly is configured to collect 30%-90% of the evaporative liquid distributed onto the evaporative heat exchanger by the evaporative liquid distribution assembly.
25. The cooling tower of claim 23 wherein
the evaporative heat exchanger is an indirect evaporative heat exchanger.
26. The cooling tower of claim 23 wherein
the fan assembly is located below the gutter assembly.
27. The cooling tower of claim 23 wherein
the gutter assembly is sloped towards the sump wherein such slope is greater than 1 degree from the horizontal.
28. The cooling tower of claim 23 wherein
the outer structure includes a door that opens to a walkway within the outer structure and below the gutter assembly.
29. The cooling tower of claim 23 wherein
each primary collection channel having a first end and each secondary collection channel having a first end, wherein the first end of the primary collection channel of the at least one channel member extends above and laterally beyond the first end of the secondary collection channel of the adjacent channel member.

30. The cooling tower of claim 29 wherein
the first end of the primary collection channel of the at least one channel member includes a lip; and
the first end of the secondary collection channel of the adjacent channel member includes a lip.

31. The cooling tower of claim 23 wherein the deflection plate includes a curved portion having the surface portion thereon.

32. The cooling tower of claim 23 wherein
each channel structure includes an assembled primary piece and a secondary piece.

33. The cooling tower of claim 23 wherein
the secondary collection channel includes a lip extending toward the deflection plate.

34. A cooling tower comprising:
an evaporative heat exchanger,
a fan assembly,
a gutter assembly below the evaporative heat exchanger,
an evaporative liquid distribution assembly, the evaporative liquid distribution assembly configured to distribute evaporative liquid onto the evaporative heat exchanger,
a sump,
wherein the gutter assembly collects at least a portion of the evaporative liquid from the evaporative heat exchanger and directs the collected evaporative liquid toward the sump,
wherein the gutter assembly includes a plurality of longitudinally extending elongate channel members,
wherein each channel member includes a primary collection channel and a secondary collection channel on opposite sides of the channel member,
wherein each channel member includes a deflection plate extending above and laterally overlapping the secondary collection channel of the channel member, the deflection plate including a surface portion configured to direct evaporative liquid toward the primary collection channel of the channel member;
wherein the primary collection channel of one of the channel members extends between and laterally overlaps the deflection plate and the secondary collection channel of an adjacent channel member so that the surface portion of the deflection plate of the one channel member directs evaporative fluid into the primary collection channel of the one channel member and evaporative liquid that overflows from the primary collection channel of the one channel member is received in the secondary collection channel of the adjacent channel member.

35. The cooling tower of claim 34 wherein
the gutter assembly is configured to collect 30%-90% of the evaporative liquid distributed onto the evaporative heat exchanger by the evaporative liquid distribution assembly.

36. The cooling tower of claim 34 wherein
the evaporative heat exchanger is an indirect evaporative heat exchanger.

37. The cooling tower of claim 34 wherein
the fan assembly is located below the gutter assembly.

38. The cooling tower of claim 34 wherein
the gutter assembly is sloped towards the sump wherein such slope is greater than 1 degree from the horizontal.

39. The cooling tower of claim 34 further comprising a pump operable to pump evaporative liquid from the sump to the evaporative liquid distribution assembly.

40. The cooling tower of claim 34 wherein
each primary collection channel includes a first end and each secondary collection channel includes a first end,
wherein the first end of the primary collection channel of the channel member extends above and laterally beyond the first end of the secondary collection channel of the adjacent channel member.

41. The cooling tower of claim 40 wherein
the first end of the primary collection channel of the one channel member includes a lip; and
the first end of the secondary collection channel of the adjacent channel member includes a lip.

42. The cooling tower of claim 34 wherein the deflection plate includes a curved portion having the surface portion thereon.

43. The cooling tower of claim 34 wherein the primary collection channel, secondary collection channel, and the deflection plate each include a longitudinal edge.

44. The cooling tower of claim 34 wherein
each channel structure includes an assembled primary piece and a secondary piece.

45. The cooling tower of claim 34 wherein
the secondary collection channel includes a lip extending toward the deflection plate.

* * * * *